(12) United States Patent
Hetzler et al.

(10) Patent No.: US 7,848,031 B2
(45) Date of Patent: Dec. 7, 2010

(54) HOLOGRAM AND METHOD OF MANUFACTURING AN OPTICAL ELEMENT USING A HOLOGRAM

(75) Inventors: Jochen Hetzler, Aalen (DE); Susanne Beder, Aalen (DE); Heiko Feldmann, Schwaebisch Gmuend (DE)

(73) Assignee: Carl Zeiss SMT AG, Oberkochen (DE)

( * ) Notice: Subject to any disclaimer, the term of this patent is extended or adjusted under 35 U.S.C. 154(b) by 572 days.

(21) Appl. No.: 11/795,598

(22) PCT Filed: Jan. 20, 2006

(86) PCT No.: PCT/EP2006/000518
§ 371 (c)(1),
(2), (4) Date: Jul. 19, 2007

(87) PCT Pub. No.: WO2006/077145
PCT Pub. Date: Jul. 27, 2006

(65) Prior Publication Data
US 2008/0137090 A1    Jun. 12, 2008

Related U.S. Application Data

(60) Provisional application No. 60/645,710, filed on Jan. 20, 2005.

(51) Int. Cl.
*G02B 3/02* (2006.01)
(52) U.S. Cl. .................. 359/708; 356/511
(58) Field of Classification Search ............. 359/642, 359/708
See application file for complete search history.

(56) References Cited

U.S. PATENT DOCUMENTS

| 4,340,306 | A |   | 7/1982  | Balasubramanian |
| 4,701,032 | A | * | 10/1987 | Takada ............... 359/654 |
| 4,732,483 | A |   | 3/1988  | Biegen |
| 5,155,553 | A |   | 10/1992 | Chen |
| 5,361,312 | A |   | 11/1994 | Kuchel |
| 5,473,434 | A |   | 12/1995 | de Groot |
| 5,488,477 | A |   | 1/1996  | de Groot |
| 5,548,403 | A |   | 8/1996  | Sommargren |

(Continued)

FOREIGN PATENT DOCUMENTS

DE         100 58 650  A1    5/2002

(Continued)

OTHER PUBLICATIONS

J. Turunen and F. Wyrowski, "Introduction to diffractive optics," in "Diffractive Optics for Industrial and Commercial Applications", ed. J. Turunen and F. Wyrowski, Akademie Verlag, 1998, pp. 1-57.

(Continued)

*Primary Examiner*—Tarifur Chowdhury
*Assistant Examiner*—Jonathon D Cook
(74) *Attorney, Agent, or Firm*—Sughrue Mion, PLLC

(57) ABSTRACT

A method of manufacturing an optical element (5) comprises testing an optical surface (3) of the optical element, using an interferometer 1a directing measuring light (23a) onto the optical surface wherein the measuring light traverses two successive holograms (44, 48) disposed in the beam path of the measuring light upstream of the optical surface.

8 Claims, 12 Drawing Sheets

U.S. PATENT DOCUMENTS

| | | | |
|---|---|---|---|
| 5,777,741 | A | 7/1998 | Deck |
| 5,982,490 | A | 11/1999 | Ichikawa et al. |
| 6,839,143 | B2 | 1/2005 | Otto |
| 7,061,626 | B1 | 6/2006 | Schillke et al. |
| 7,118,449 | B1 * | 10/2006 | Dinger et al. .................. 451/6 |
| 7,167,251 | B1 | 1/2007 | Ulrich et al. |
| 2002/0063867 | A1 | 5/2002 | Otto |
| 2003/0184762 | A1 | 10/2003 | Kim et al. |
| 2005/0275849 | A1 | 5/2005 | Freimann et al. |

FOREIGN PATENT DOCUMENTS

DE      101 13 017 A1      9/2002

OTHER PUBLICATIONS

Daniel Malacara, "Optical Shop Testing", 2$^{nd}$ Edition, John Wiley & Sons Inc., 1992, Chapter 2.1, 2.6, 12, 15.1, 15.2, 15.3, pp. 51-53, 73-77, 427-454, 599-612.

M. A. Golub, "Generalized conversion from the phase function to the blazed surface-relief profile of diffractive optical elements", J. Opt. Soc. Am. A, vol. 16, No. 5, May 1999, pp. 1194-1201.

P.P. Naulleau et al., "Extreme-ultraviolet phase-shifting point-diffraction interferometer: a wave-front metrology tool with subangstrom reference-wave accuracy", Applied Optics, vol. 38, No. 35, Dec. 10, 1999, pp. 7252-7263.

P. Lalanne et al., "Blazed binary subwavelength gratings with efficiencies larger than those of conventional echelette gratings", Optics Letters, vol. 23, No. 14, Jul. 15, 1998, pp. 1081-1083.

S. Astilean et al., "High-efficiency subwavelength diffractive element patterned in a high-refractive-index material for 633 nm", Optics Letters, vol. 23, No. 7, Apr. 1, 1998, pp. 552-554.

Rolf Freimann et al., "Absolute measurement of non-comatic aspheric surface errors", Optics Communications 161, 1999, Elsevier Science B.V., pp. 106-114.

\* cited by examiner

HOLOGRAM AND METHOD OF MANUFACTURING AN OPTICAL ELEMENT USING A HOLOGRAM

CROSS REFERENCE TO RELATED APPLICATIONS

This application is a National Stage application of International Application No. PCT/EP2006/000518, filed Jan. 20, 2006, which designates the United States and was published in English, and which claims the benefit of U.S. Provisional Application No. 60/645,710, filed Jan. 20, 2005. These applications, in their entirety, are incorporated herein by reference.

BACKGROUND OF THE INVENTION

1. Field of the Invention

The present invention relates to a method of manufacturing an optical element. In particular, the invention relates to a method of manufacturing an optical element having an aspherical shape.

2. Brief Description of Related Art

The optical element having the optical surface is, for example, an optical component such as an optical lens or an optical mirror used in optical systems, such as telescopes used in astronomy, and systems used for imaging structures, such as structures formed on a mask or reticle, onto a radiation sensitive substrate, such as a resist, in a lithographic method. The success of such an optical system is substantially determined by the accuracy with which the optical surface can be processed or manufactured to have a target shape determined by a designer of the optical system. In such manufacture it is necessary to compare the shape of the processed optical surface with its target shape, and to determine differences between the processed and target surfaces. The optical surface may then be further processed at those portions where differences between the processed and target surfaces exceed e.g. predefined thresholds.

Interferometric apparatuses are commonly used for high precision measurements of optical surfaces. Examples of such apparatus are disclosed in U.S. Pat. No. 4,732,483, U.S. Pat. No. 4,340,306, U.S. Pat. No. 5,473,434, U.S. Pat. No. 5,777,741, U.S. Pat. No. 5,488,477. The entire contents of these documents are incorporated herein by reference.

The conventional interferometer apparatus for measuring a spherical optical surface typically includes a source of coherent light and an interferometer optics for generating a beam of measuring light incident on the surface to be tested, such that wavefronts of the measuring light have, at a position of the surface to be tested, a same shape as the target shape of the surface under test. In such a situation, the beam of measuring light is orthogonally incident on the surface under test, and is reflected therefrom to travel back towards the interferometer optics. Thereafter, the light of the measuring beam reflected from the surface under test is superimposed with light reflected from a reference surface and deviations of the shape of the surface under test and its target shape are determined from a resulting interference pattern.

While spherical wavefronts for testing spherical optical surfaces may be generated with a relatively high precision by conventional interferometer optics, more advanced optics, which are also referred to as compensators, null lens arrangements, or K-systems, are necessary to generate beams of measuring light having aspherical wavefronts such that the light is orthogonally incident at each location of the aspherical surface under test. Background information relating to null lens arrangements or compensators is available e.g. from the text book of Daniel Malacara "Optical Shop Testing", $2^{nd}$ Edition, John Wiley & Sons, Inc. 1992, Chapter 12.

The compensator for generating the aspherical wavefronts may comprise one or more refractive optical elements, such as lenses. It is also known to use a diffractive element such as a hologram in a compensator for generating the aspherical wavefronts. Background information and examples of using holograms in interferometric measurements are illustrated in Chapters 15.1, 15.2, and 15.3 of the text book of Daniel Malacara mentioned above. The hologram may be a real hologram generated by exposing a suitable material, such as a photographic plate, with interfering light beams, or a synthetic hologram, such as a computer generated hologram (CGH) generated by simulating the interferometer set up by a suitable computational method, such as ray tracing, and producing the hologram by manufacturing steps using a pen plotter and optical reduction, lithographic steps, laser beam recorders, electron beam recorders and others.

It has been found that the conventional methods of testing and manufacturing aspherical optical surfaces using a hologram have an insufficient accuracy in some applications.

SUMMARY OF THE INVENTION

The present invention has been accomplished taking the above problems into consideration.

Thus, it is an object of the present invention to provide a method of testing and manufacturing an optical element having an aspherical surface of a relatively high accuracy.

The forgoing objects are accomplished by providing a method comprising testing an optical element by using an interferometer optics having at least one diffractive optical element or hologram for generating a beam of measuring light having suitable wavefronts for testing the optical surface of the optical element to be manufactured.

According to an aspect of the invention, the method of testing the aspherical surface uses at least two holograms, which are disposed at a distance from each other in the beam path of measuring light interacting with the surface to be tested.

The inventors have found that, in the conventional interferometer system using only one single hologram in the optical beam path, a considerable distortion is generated in the image of the optical surface formed on a detector of the interferometer system. Due to such distortion, a local scale or magnification of the images changes across the detector. Since a pixel resolution of the detector is limited, there are portions of the image where the reduced imaging scale and resolution of the imaging is considerably reduced as compared to other regions of the detector. As a result, the surface shape of the optical element may not be determined with a desired high resolution across the whole surface thereof.

By using at least two holograms disposed at a distance from each other in the optical beam path of the beam of measuring light, it is possible to compensate for such distortion, such that a local imaging scale is substantially uniform across the whole surface of the optical element under test. Further, it is possible to adjust the local scale to particular needs, such as an increased scale for selected portions of the optical element under test, where an increased accuracy is desired.

Exemplary embodiments of the invention comprise disposing at least one refractive element in the beam path, upstream or downstream of the first hologram and/or the second hologram. The refractive element, such as a lens, may contribute to the generation of the wavefronts in the beam of measuring light incident on the optical element to be tested, wherein the refractive element provides additional optical power which is then not to be provided by the hologram. This may contribute to a more uniform line density of the hologram.

According to an exemplary embodiment of the invention, the interferometric measurement of the optical surface is performed with measuring light reflected from the optical surface to be tested. According to an alternative exemplary embodiment, the interferometric measurement is performed with light having traversed the optical surface to be tested.

According to an exemplary embodiment of the invention, at least one of the at least two holograms is a blazed hologram having at least a portion in which grating-forming structures provide a blazed grating for reducing an intensity of unwanted diffraction orders. Such unwanted diffraction orders deteriorate a quality of an interference pattern generated on the detector of the interferometer apparatus by superimposing reference light with the measuring light comprising the desired diffraction order of the hologram. Since the at least two holograms used in the interferometric measurement may generate a high multitude of diffraction orders, a reduction of intensity of the unwanted diffraction orders is particularly useful.

According to an embodiment herein, the hologram comprises higher quality blazed grating-forming structures in those portions where a pitch of the grating-forming structures is high, and the hologram comprises lower quality blazed or non-blazed grating-forming structures in those portions where the pitch of the grating-forming structures is relatively small.

The regions of the high pitch of the grating-forming structures generate low deflection angles of the beam of measuring light such that a separation of the desired diffraction orders from the unwanted diffraction orders may not readily be achieved or may be even impossible. However, the high quality blaze provided in those regions is advantageous in at least reducing the intensity of the unwanted diffraction orders. In the other regions of the hologram where the pitch of the grating-forming structures is small, lower quality blazed grating-forming structures may be used since the higher diffraction angles provided to the rays of measuring light makes it easier to separate the desired diffraction orders from the unwanted diffraction orders.

According to a further exemplary embodiment, the optical surface to be tested is an aspherical surface having substantial deviations from a spherical shape. Within the context of the present application, an optical surface may be referred to as an aspherical surface if the aspherical surface differs from its best approximating sphere by more than a predetermined criterion. One such criterion is based on a gradient of the difference between the aspherical surface and its best approximating sphere, and the optical surface is referred to as an aspherical surface if such gradient exceeds a value of 6 µm divided by an effective diameter of the optical surface.

Embodiments of the present invention allow to test and manufacture highly aspherical surfaces having a high surface quality. A measure for determining an amount of asphericity, i.e. an amount of deviation from a spherical surface shape, may be calculated from geometrical parameters of the optical surface. For example, a minimum curvature $c_{min}$ of the optical surface and a maximum curvature $c_{max}$ of the optical surface can be used for this purpose. For example, the expression $(c_{max}-c_{min})$ can be used as a suitable measure for determining an amount of asphericity. In the context of the present application, an optical surface fulfilling $(c_{max}-c_{min})>1\text{ m}^{-1}$ is considered to be a highly aspherical surface.

An optical surface is considered to be of a high quality when differences between an actual shape of the optical surface and a target shape thereof are within given tolerances. The tolerances depend on the application for which the optical surface is designed and can be chosen by one of ordinary skill in the art based upon a desired application. Typically, tolerances are lower for applications using shorter wavelengths of the light used in the imaging application. Further, different tolerances can be defined for different spatial length scales over which surface variations occur. Such spatial length scales are also referred to as a period of a spatial frequency. For example, different tolerances can be defined as root-mean-square (RMS) values of a distribution of the differences between the surface shape and its target shape in a lateral direction of the surface for different spatial frequencies. For example, a first tolerance can be defined for differences in a low spatial frequency range (LSFR) in a length scale range of the order of about millimeters to some ten centimeters which usually corresponds to dimensions in the order of about one tenth of a diameter of the optical surface up to the full diameter of the optical surface. Such tolerances typically represent a shape error of the optical surface. Shape errors of the optical surface contribute to aberrations of an optical system in which the optical surface is used.

Processing for reducing deviations in the low spatial frequency range typically include milling, grinding, fine grinding, such as loose abrasive grinding, polishing and others. Methods of measuring deviations or surface errors of this spatial frequency range typically include interferometric measuring methods using measuring beams of light having a diameter corresponding to the diameter of the optical surface or less, if a stitching method is used in which measuring results of portions of the optical surface are stitched together to achieve a measuring result indicative of the surface shape of the whole surface.

Polishing tools are typically used to reduce deviations in a medium spatial frequency range (MSFR) in a length scale range of the order of about millimeters down to about micrometers, and in a high spatial frequency range (HSFR) in a length scale range in the order of about micrometers down to about the wavelength of the light used in the application. Tolerances defined for the medium spatial frequency range and the high spatial frequency range typically represent a surface roughness of the optical surface. Surface deviations in the medium spatial frequency range may contribute to a stray light or flare within an optical field of the optical system in which the optical surface is used. Measurements for determining deviations in the medium spatial frequency range MSFR may, for example, include micro-interferometric methods wherein only selected portions of the main surface are measured at a same time. Surface deviations in the high spatial frequency range may contribute to a reduction of reflectivity of the optical surface if used as a mirror in an optical system. Measurements for determining deviations in the high spatial frequency range HSFR may, for example, include an atomic force microscope (AFM).

Typically, an optical surface is considered to be of a high quality if root-mean-square (RMS) values of surface deviations, i.e. of differences between an actual surface shape and its target shape, are below suitable low threshold values in each of the spatial frequency ranges LSFR, MSFR and HSFR.

For determining the quality of an optical surface in the low spatial frequency range LSFR, it is typically necessary to compare the actual surface shape with its target shape. Thus, it is usually necessary to know the target shape of a given optical surface to determine whether this optical surface is of a certain quality in the low spatial frequency range LSFR, since an absolute determination of such deviations has to be determined in units such as nanometers (nm). However, if it is known that the target shape of the given optical surface is rotational symmetric, it will be possible to determine absolute non-rotationally symmetric surface errors of that surface without knowing the precise definition of the radial surface profile of that rotationally symmetric optical surface. For example, if the optical surface is used as an optical element in an optical system having an optical axis, it is evident that the optical surface will have rotational symmetry for achieving an optimal performance of the optical system.

The rotationally asymmetric surface errors of an optical surface having a rotationally symmetric surface shape can be determined as follows: The optical surface is tested by plural interferometric measurements taken at plural rotational positions of the optical surface about its optical axis defining the rotational symmetry of the optical surface. The results of the plural interferometric measurements are averaged, and a difference between the averaged interferometric measurements and one interferometric measurement of the plural interferometric measurements is calculated. This result may represent absolute non-rotationally symmetric surface errors of the optical surfaces in unit such as nanometers, without precisely knowing further information on the target shape of the optical surface apart from its rotationally symmetric property. Background information on determining absolute values of rotationally symmetric surface errors can be obtained from U.S. Pat. No. 6,839,143 B2 and the article "Absolute measurement of non-comatic aspheric surface errors" by Rolf Freimann et al., Optics Communications 161 (1999), pages 106 to 114.

Based on the above illustrations, an embodiment of the present invention provides a highly aspheric rotationally symmetric optical surface fulfilling $(c_{max}-c_{min})>1$ m$^{-1}$ and $\sigma_{RMSa}<1.0$ nm, wherein $\sigma_{RMSa}$ indicates a root-mean-square value of an absolute non-rotationally symmetric surface error of the optical surface.

Also the surface deviations in the medium spatial frequency range MSFR can be determined without exactly knowing the overall target shape of the given optical surface since deviations in the medium and high spatial frequency ranges can be determined as local properties of the optical surface. Thus, the deviations in the medium and high spatial frequency ranges can be determined from surface data by, for example, calculating a distribution of differences between the surface data and an average thereof. The average can be determined by mathematical methods involving smoothing or other suitable methods.

Based on the above, embodiments of the present invention provide an optical element having a highly aspheric optical surface, which is not necessarily rotationally symmetric, and which fulfills: $(c_{max}-c_{min})>1$ m$^{-1}$ and $\sigma_{RMS}<1.0$ nm, wherein $\sigma_{RMS}$ represents an RMS value of the surface roughness determined for a spatial frequency scale in a range from 0.3 mm to 10.0 mm.

As already illustrated above, embodiments of the present invention allow to test and manufacture highly aspherical surfaces by reducing variations of a local imaging scale in the imaging of the optical surface onto a detector.

Without knowing details of the imaging optics, such local imaging scale variations occurring in the conventional method can be determined from properties of the optical surface alone: The expression $$\beta(\phi, x, y) = \frac{1/c(\phi, x, y) * \cos^3(\alpha(x, y))}{(z(x, y) - d + 1/c(\phi, x, y) * \cos(\alpha(x, y)))}$$

can be understood as representing a measure of a local imaging scale derived from properties of the optical surface itself.

Herein, x and y are lateral coordinates of the optical surface, and $z(x,y)$ is a surface elevation at location $(x,y)$, wherein $z=0$ is fulfilled for at least one location $(x_0,y_0)$. $\alpha(x,y)$ is an angle between a surface normal of the optical surface at location $(x,y)$ and an average surface normal of a portion of the optical surface which is imaged onto the detector. $c(\phi,x,y)$ is a curvature of the optical surface at location $(x,y)$, wherein a corresponding contacting sphere, contacting the optical surface at location $(x,y)$, is oriented at an angle $\phi$ in the xy-plane. Parameter d is a suitable constant which may be defined by $d=\max(z(x,y))+50$ mm, wherein $\max(z(x,y))$ is the maximum value of z for all locations $(x,y)$.

With such definition of $\beta(\phi,x,y)$ it is possible to define a property $\Delta\beta$ of an optical surface for generating local imaging scale variations in the conventional interferometric method by $\Delta\beta=\max(\beta(\phi,x,y))/\min(\beta(\phi,x,y))$, wherein $\max(\beta(\phi,x,y))$ is the maximum value of $\beta$ for all locations $(x,y)$ and all orientations $\phi$. Similarly, $\min(\beta(\phi,x,y))$ is the minimum value of $\beta$ for all locations $(x,y)$ and all orientations $\phi$.

Based on the illustrations given above, embodiments of the present invention provide an optical element comprising at least one optical surface which has a high surface quality of $\sigma_{RMS}<1.0$ nm determined for a spatial frequency scale in a range from 0.3 mm to 10.0 mm, and having a local imaging scale variating property $\Delta\beta>1.2$.

Further, embodiments of the present invention provide an optical element comprising at least one rotationally symmetric optical surface of a high surface quality with $\sigma_{RMSa}<1.0$ nm and having a local imaging scale variating property $\Delta\beta>1.2$.

In some embodiments of the present invention, the processing of the optical surface may comprise a machining such as milling, grinding, loose abrasive grinding, polishing, ion beam figuring, magneto-rheological figuring, and finishing of the optical surface of the optical element.

According to an embodiment, the finishing comprises applying a coating to the optical surface. The coating may comprises a coating such as a reflective coating, an anti-reflective coating and a protective coating.

Other embodiments of the present invention provide a hologram comprising a substrate and a grating provided thereon, wherein the grating comprises a first region in which a grating pitch is low, and a second region, in which the grating pitch is high, i.e. grating forming structures in the second region are repetitive in a greater length scale than in the first region. The grating forming structures in the second region provide a higher quality blaze than the grating forming structures in the first region. This is achieved by including a higher number of path length providing elements in the grating forming structures of the second region as compared to those of the first region.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
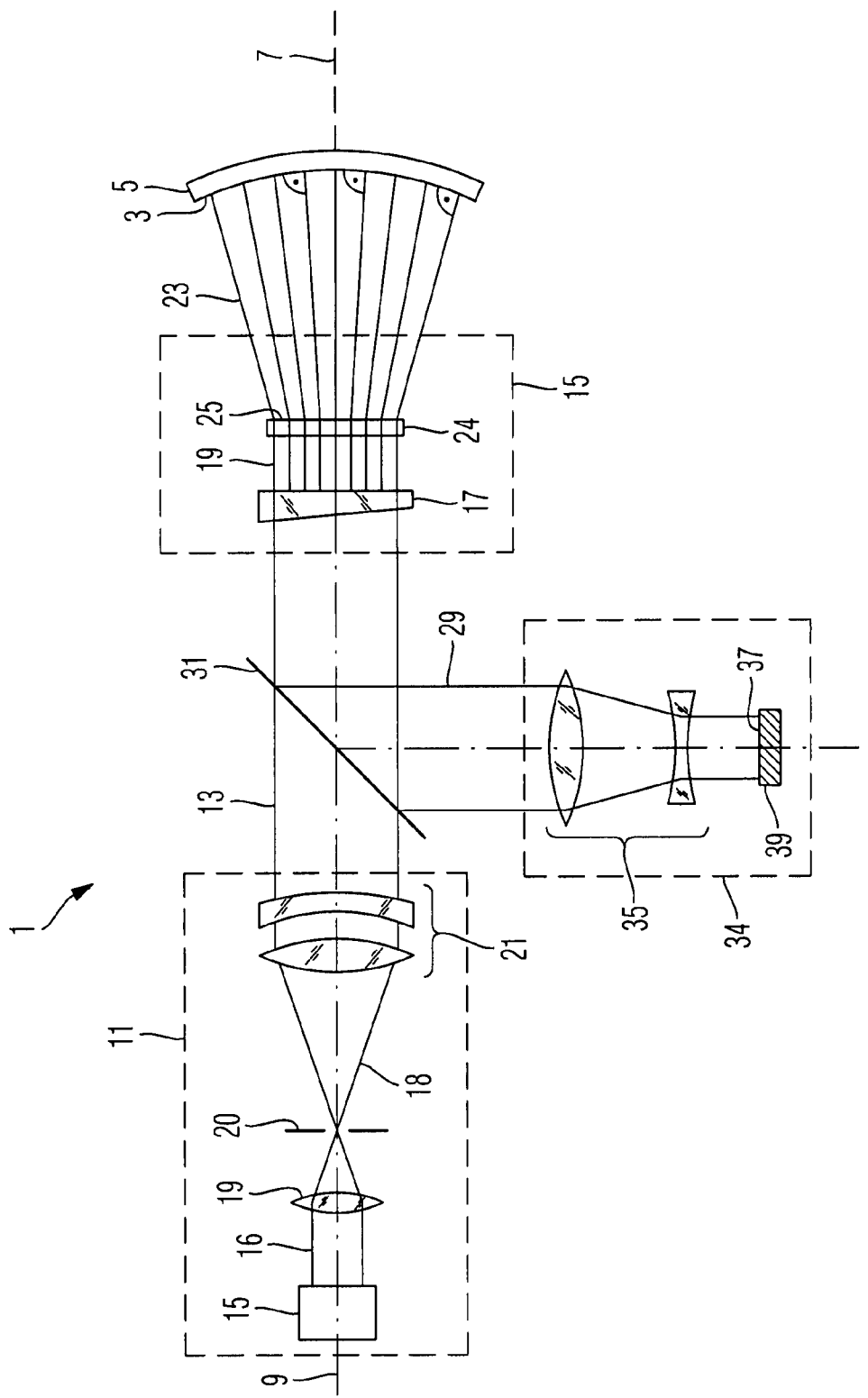
FIG. 1 illustrates an interferometer system for testing an optical element according to a comparative example in which one single hologram is used.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

The exemplary embodiments of methods described below involve interferometrically taking measurements of wavefronts generated by an interaction of an incident beam of measuring light provided by an interferometer apparatus with a surface to be measured. Plural conventional interferometric methods may be used as a basis for taking such measurements. Examples of such interferometric methods are disclosed in e.g. U.S. Pat. No. 5,361,312, U.S. Pat. No. 5,982,490 and US 2002/0063867 A1. The entire contents of these patents and publications are incorporated herein by reference.

For illustrating the particularities of embodiments of the present invention, an interferometer system of a conventional type of using one single hologram is first illustrated with reference to FIGS. 1 and 2.

The interferometer system 1 of the conventional type, shown in FIG. 1, is used for testing an aspherical mirror surface 3 of a mirror 5. The mirror surface 3 of this example has a rotationally symmetric shape about an axis of symmetry 7.

The interferometer system 1 comprises a light source 11 for generating a beam 13 of measuring light. The light source 11 comprises a helium neon laser 15 emitting a laser beam 16. Beam 16 is focused by a focusing lens 19 onto a pin hole aperture of a spatial filter 20 such that a diverging beam 18 of coherent light emerges from the pin hole. Wavefronts in diverging beam 18 are substantially spherical wavefronts. The diverging beam 18 is collimated by a group of lenses 21 having an optical axis 9, to form the parallel beam 13 of measuring light having substantially flat wavefronts. Beam 13 traverses an interferometer optics 15 which transforms and shapes the beam 13 of measuring light such that a beam 23 supplied by the interferometer optics 15 and incident on the optical surface 3 has wavefronts of a shape which corresponds to a target shape of optical surface 3 at each location thereof. Thus, if the optical surface 3 is machined such that its surface shape corresponds to the target shape, the light of beam 23 is orthogonally incident on the optical surface 3 at each location thereof. The light reflected from the optical surface 3 will then travel back exactly the same way as it was incident on the optical surface 3, traverse the interferometer optics 15, and a portion thereof will be reflected from a beam splitter 31 disposed in the portion of the beam 13 of measuring light where beam 13 is the parallel beam having the flat wavefronts. A beam 29 reflected from the beam splitter 31 is imaged onto a photo sensitive surface 37 of a camera chip 39 through an objective lens system 35 of a camera 34, such that the optical surface 3 is imaged onto the camera 34.

The interferometer optics 15 comprises a wedge shaped substrate 17 having a flat surface 19 which is oriented orthogonally to the parallel beam 13 of measuring light having traversed substrate 17. Surface 19 forms a Fizeau surface of interferometer system 1 in that it reflects a portion of the beam 13 of measuring light. The reflected portion of the beam 13 of measuring light forms reference light for the interferometric method. The reference light reflected back from Fizeau surface 19 travels back a same path as it was incident on surface 19, and is thus superimposed with the measuring light reflected from optical surface 3. The reference light is also deflected by beam splitter 31 and imaged onto the photo sensitive surface 37 of camera 39, such that an interference pattern generated by superimposing the wavefronts reflected from the optical surface 3 and the wavefronts reflected back from Fizeau surface 19 may be detected by camera 34.

As mentioned above, the interferometer optics 15 is designed such that it transforms the entering beam 13 of measuring light having the parallel wavefronts into the beam 23 of measuring light having the aspherical wavefronts at the position of the optical surface 3. For this purpose, the interferometer optics 15 comprises a substrate 24 having two parallel flat surfaces wherein one surface 25 disposed opposite to the optical surface 3 carries a hologram 25. The hologram 25 is a computer generated hologram (CGH) designed such that it diffracts the beam 13 having the flat wavefronts exactly such that the wavefronts in the beam 23 at the position of the optical surface 3 will have a shape which substantially corresponds to the target shape of the optical surface 3. The hologram 25 is generated by calculating a corresponding grating using a computer and involving methods such as ray tracing and plotting the calculated grating on surface 25 of the substrate. The grating may be formed by a lithographic method, for example. Background information with respect to holograms used in interferometry may be obtained from Chapter 15 of the above mentioned text book of Daniel Malacara.

Figure 2:
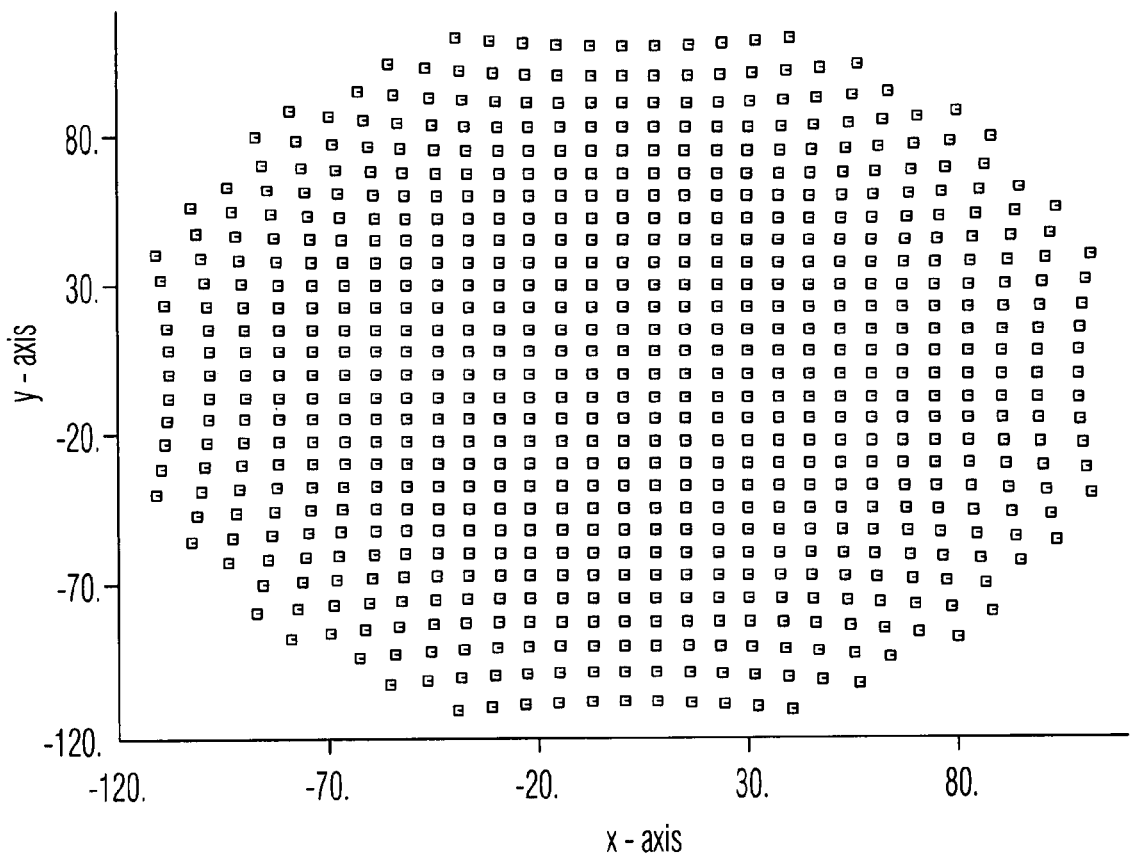
FIG. 2 shows a distorted array of locations on the optical element which is imaged into a regular array of locations on a detector in the interferometer system shown in FIG. 1.

FIG. 2 shows a distorted array of locations on the optical surface 3 which is imaged into a regular area of locations on the light sensitive surface 37 of detector 34. There exists an imaging relationship between the distorted array on the optical surface 3 and the regular array on detecting surface 37.

FIG. 1 also shows rays of beam 13 traversing hologram 25 evenly spaced from each other. The spacing between these rays on the optical surface 3 increases with increasing distance from the axis 7.

The pixels of detector chip 39 are arranged in a regular rectangular area of a constant pitch. Due to the distortion of the interferometer optics 15, however, the locations on the optical surface 3 which are imaged onto corresponding pixels of the detector are not arranged in a rectangular regular area of constant pitch. The spacing between adjacent locations on the optical surface 3 increases with increasing distance from the axis 7. Thus, a resolution of the imagining onto the detector is reduced with increasing distance from the center of the optical surface 3. An accuracy of the interferometric measurement of the optical surface 3 will be reduced at a periphery thereof, and as compared to the center of the optical surface.

The ability of an optical surface to generate imaging scale variations can be derived from the optical surface itself, as illustrated with reference to FIG. 16 below.

Figure 16:
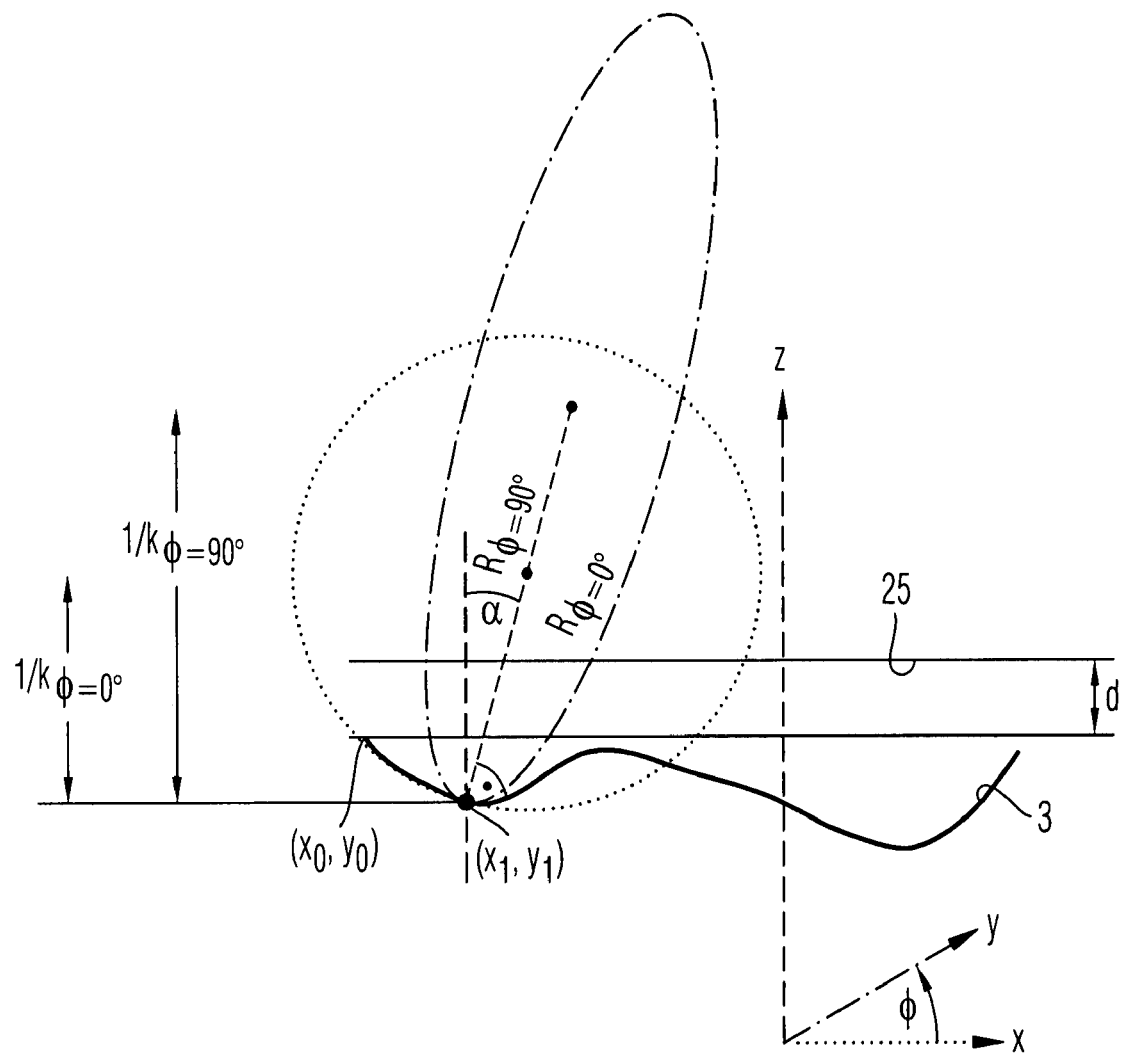
FIG. 16 is a graph for illustrating some of the properties of an aspherical surface used in the present specification.

FIG. 16 indicates an aspherical surface 3 of an arbitrary shape disposed in a coordinate system x, y, z wherein x and y are lateral coordinates of the optical surface 3. At a location $(x_0,y_0)$ of the optical surface, the coordinate value z or elevation of the optical surface is chosen to be zero at $(x_0,y_0)$, i.e. $z(x_0,y_0)=0$. In the illustrated example, z=0 is also the maximum value of z of all locations (x,y), i.e. max(z(x,y))=0. A hologram 25 is disposed at a distance d=50 mm from z=0, i.e. the hologram 25 is disposed at z=50 mm. $\phi$ indicates an angle in the xy-plane, wherein $\phi=0$ extends in the x-direction.

FIG. 16 further indicates two circles contacting the surface 3 at an arbitrary location $(x_1,y_1)$. The first circle has a radius $R_{\phi=0}°$, wherein $\phi=0°$ indicates that the x-direction coincides with a plane in which the circle extends. The second circle has a radius $R_{\phi=90}°$, wherein $\phi=90°$ indicates that the y-direction extends in a plane of the circle. At location $(x_1,y_1)$, the surface has curvatures $c(0,x_1,y_1)=1/R_{\phi=0}$ and $c(90°,x_1,y_1)=1/R_{\phi=90}°$, determined for the orientations $\phi=0°$ and $\phi=90°$, respectively. If a curvature $c(\phi,x,y)>0$, the surface is concave at location (x,y) and at orientation $\phi$, and if a curvature $c(\phi,x,y)<0$, the surface is convex at location (x,y) and at orientation $\phi$.

$R_{\phi=90}°$ is greater than $R_{\phi=0}°$, from which it is apparent that the surface 3 has an aspherical shape at location $(x_1,y_1)$ since the radii of curvature of surface 3 are different for different orientations of the contacting circles.

$\alpha$ indicates an angle between a surface normal of the surface at location $(x_1,y_1)$ relative to an average surface normal of optical surface 3. In the example depicted in FIG. 16, it is assumed that the average surface normal coincides with the z-direction. However, that this is not necessarily fulfilled for an arbitrary aspherical surface tested in an interferometric measuring apparatus as shown in FIG. 1.

$1/k_{\phi=0}$ indicates a distance measured in the z-direction between the center of the circle with radius $R_{\phi=0}$ and location $(x_1,y_1)$, and similarly, $1/k_{\phi=90}$ represents the projected distance between the center of the circle of radius $R_{\phi=90}$ and location $(x_1,y_1)$. In practice, 1/k represents a distance of a caustic generated from a beam of light having normal incidence on a region of the optical surface about location $(x_1,y_1)$. k can be calculated by $$k(\phi, x, y) = \frac{c(\phi, x, y)}{\cos(\alpha(x, y))},$$

and d can be written as d=max(z(x,y))+50 mm, wherein d>0. A local scale $\beta$ can be defined as $$\beta(\phi, x, y) = \frac{\cos^2(\alpha(x, y))}{\left[1 - \frac{(d - z(x, y)) * c(\phi, x, y)}{\cos\alpha(x, y)}\right]},$$

and a maximum local scale deviation $\Delta\beta$ generated by aspherical surface 3 can be defined as $$\Delta\beta = \frac{\max(\beta(\phi, x, y))}{\min(\beta(\phi, x, y))},$$

wherein max($\beta(\phi,x,y)$) is the maximum value of $\beta$ for all locations (x,y) of the optical surface and all orientations $\phi$. Similarly, min($\beta(\phi,x,y)$) is the minimum value of $\beta$ for all locations (x,y) of the optical surface and all orientations $\phi$.

Figure 3:
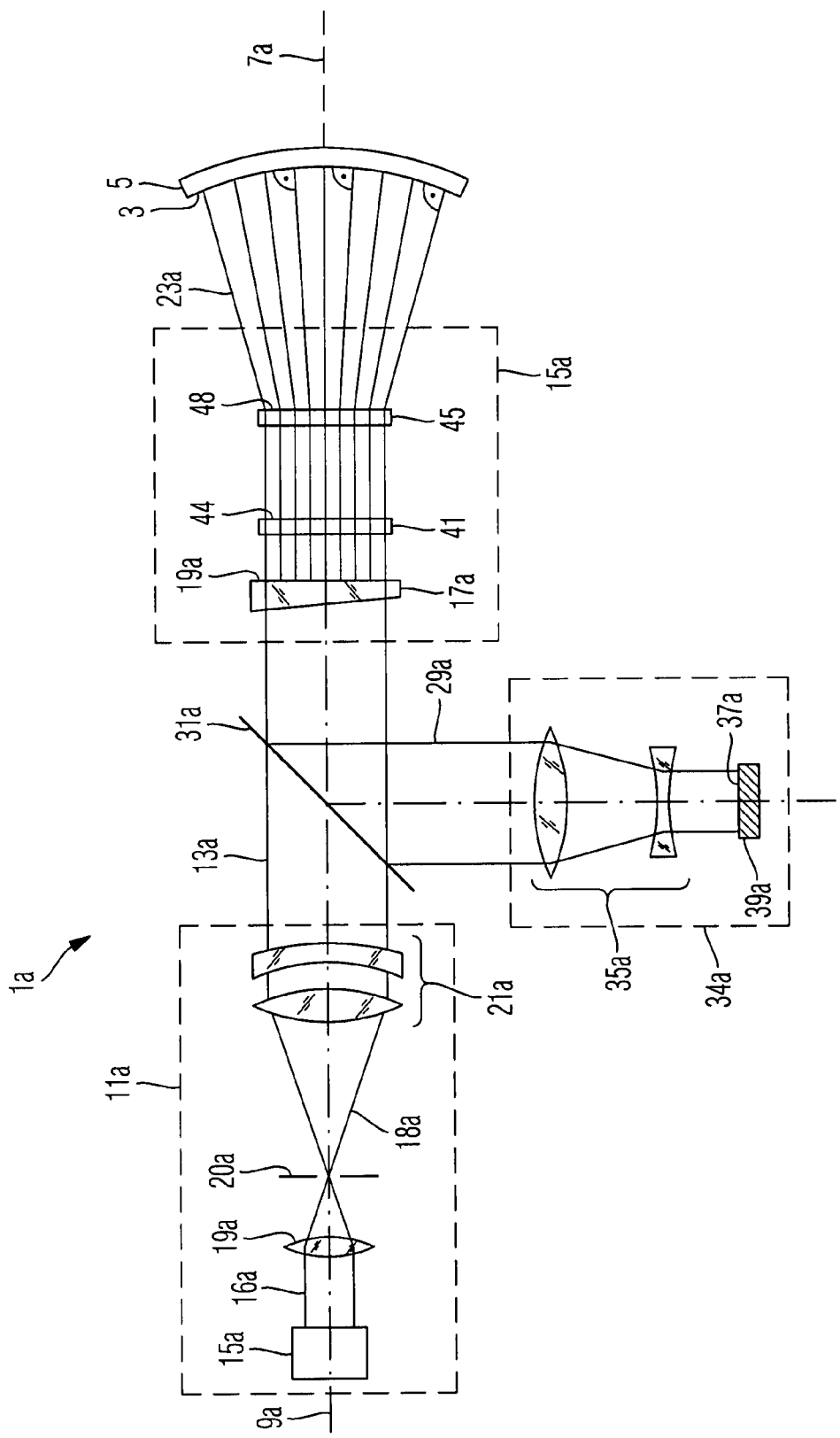
FIG. 3 illustrates an interferometer system for testing an optical element according to a first embodiment of the invention, in which two holograms are used.

FIG. 3 shows an interferometer system 1a according to an embodiment of the invention for testing the optical surface 3 of the optical element 5 shown in FIG. 1. The interferometer system 1a is similar to that shown in FIG. 1 and differs therefrom in the configuration of an interferometer optics for generating a beam 23a orthogonally incident on optical surface 3.

The interferometer optics 15a comprises a slightly wedge shaped plate 17a providing a Fizeau surface 19a of the interferometer system 1a, a substrate 41 having two opposite surfaces 42, 43 and carrying a first hologram 44 on surface 43, and a substrate 45 provided at a distance from substrate 41 and having two opposite surfaces 46, 47 and carrying a hologram 48 on surface 47. The two holograms 44 and 48 are computer generated holograms designed such that a beam 13a of measuring light having substantially flat wavefronts is transformed into a beam 23a having aspherical wavefronts corresponding to the target shape of optical surface 3 such that beam 23a is orthogonally incident on the optical surface 3 at each location thereof.

Figure 4:
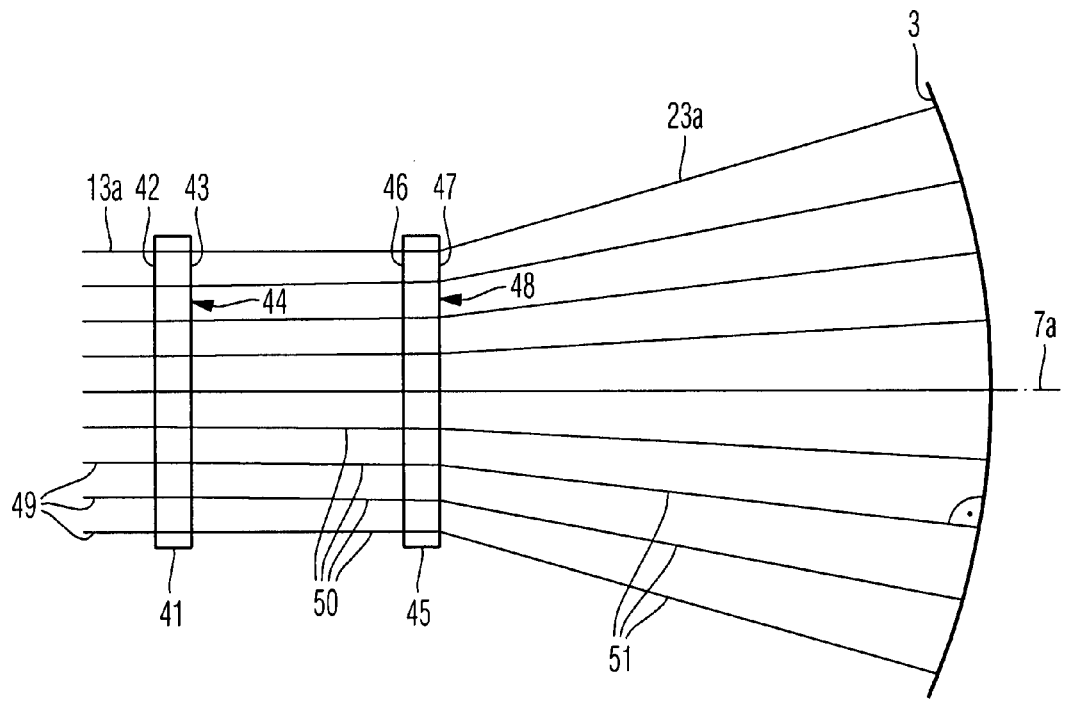
FIG. 4 shows an enlarged detailed portion of the interferometer system shown in FIG. 3.
Figure 5:
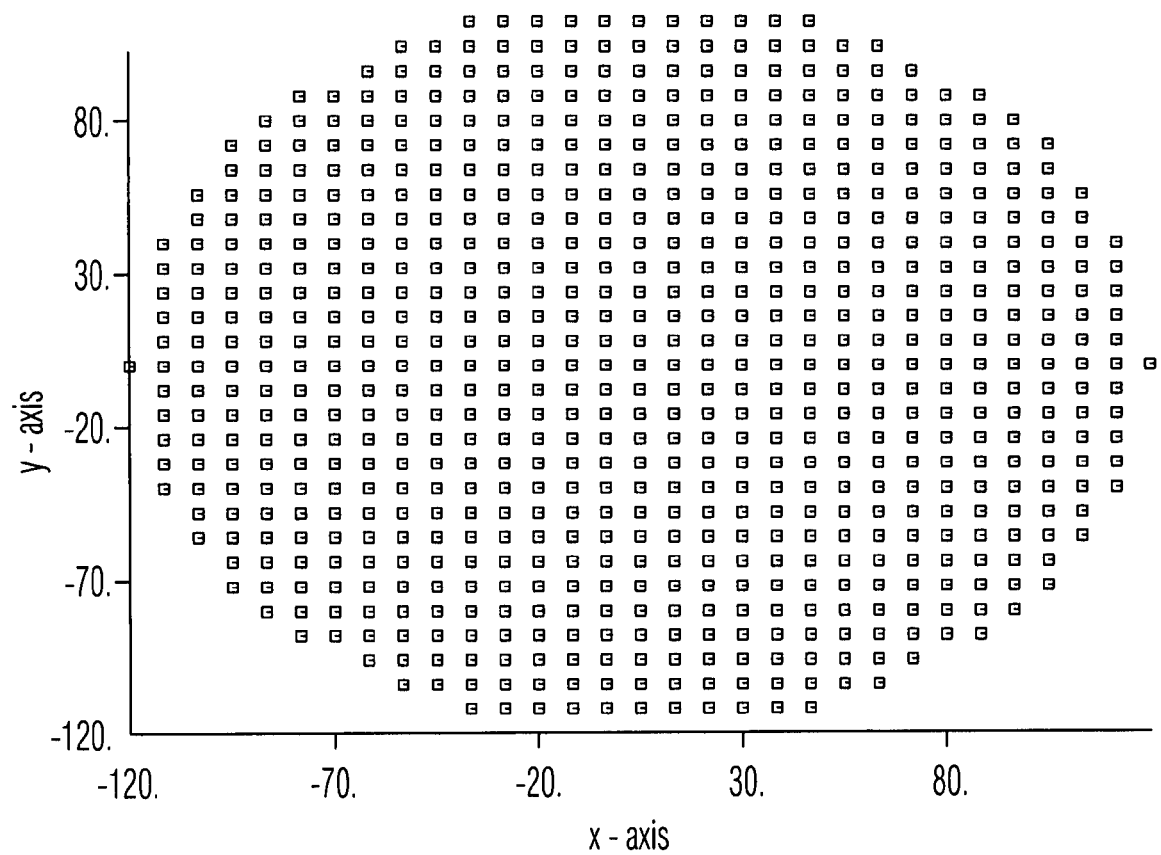
FIG. 5 shows an array of locations on the optical element which is imaged into a regular array of locations on a detector in the interferometer system shown in FIG. 3.

FIGS. 3 and 4 show rays 49 which are evenly spaced from each other on the surface 43 carrying the first hologram 44. Rays 49 are diffracted by hologram 44 into rays 50 such that a spacing between rays 50 is continuously reduced with increasing distance from axis 7a on the surface 47 carrying the hologram 48. Hologram 48 diffracts rays 50 to form rays 51 which are evenly spaced from each other on the optical surface 3. It appears that the imaging of the optical surface 3 onto the light sensitive surface 37a of detector 35a is substantially free of distortion. This is also apparent from FIG. 5 showing an array of locations on the optical element 3 which is imaged into a regular rectangular array of locations on light sensitive surface 37a of detector 34a. The array shown in FIG. 5 is a substantially regular array as compared to the array shown in FIG. 2 obtained with the interferometer optics of the conventional type having one single hologram. Thus, the interferometer system 1a using two holograms 44 and 48 disposed at a distance from each other allows a considerable reduction in the imaging distortion of the interferometer optics 15a for measuring aspherical optical surfaces. The determination of the surface shape of the optical element 3 may be performed with a substantially equal accuracy across the whole surface of the optical surface 3, accordingly.

In the following, details of the interferometer optics 15a and the optical surface 3 are illustrated. The aspherical optical surface 3 may be represented by the following formula:

$$z = \frac{ch^2}{1 + SQRT\{1 - (1+k)c^2h^2\}} + Ah^4 + Bh^6 + Ch^8 + Dh^{10} + Eh^{12} + Fh^{14} + Gh^{16} + Hh^{18} + Jh^{20}$$

where
z is the sag of the surface parallel to the z-axis
c is the curvature at the pole of the surface (CUY)
k is the conic coefficient (K) and
A, B, C, D, are the 4th, 6th, 8th, 10th, 12th, 14th, 16th, 18th, 20th
E, F, G, H, J order deformation coefficients respectively;
A=B=C=D=E=F=G=H=J=0 for a pure conic surface $$h^2 = x^2 + y^2 \quad \text{(formula 1)}$$

In the illustrated example of FIG. 3, the parameters of optical surface 3 in this formula are:

| | | |
|---|---|---|
| K: 0.000000 | A: 0.000000E+00 | B: −.350000E−12, |
| C: 0.000000E+00 | D: 0.000000E+00 | |

The optical data of the optical elements in the beam path of the measuring light are given in Table 1.

TABLE 1

| Surface | Radius | Distance | Edge Thickness | yMax | Medium | Refractive Index |
|---|---|---|---|---|---|---|
| 42 | ∞ | 15.00000 | 15.00000 | 70.00000 | SIO2HL | 1.4570358 |
| 43 | ∞ | 100.00000 | 100.00000 | 70.00000 | air | 1.0000000 |
| 46 | ∞ | 15.00000 | 15.00000 | 70.00000 | SIO2HL | 1.4570358 |
| 47 | ∞ | 182.61448 | 166.95583 | 70.00000 | | 1.0000000 |
| 3 | −500.00000 | | | 120.00000 | REFL | |

The phase function in mm of holograms 44 and 48 may be represented by the polynomial $$C_1 r^2 + C_2 r^4 + \ldots \quad \text{(formula 2)}$$

wherein in $r^2 = x^2 + y^2$.

The coefficients of this polynomial for the first hologram 44 are:

| | | |
|---|---|---|
| C1: 3.9662E−04 | C2: 1.9126E−08 | C3: −9.2030E−12 |
| C4: −6.0838E−16 | C5: 1.1364E−19 | C6: 8.3906E−23 |
| C7: −1.1693E−26 | C8: 1.8023E−30 | C9: −9.7394E−33 |
| C10: 6.6872E−36 | C11: −2.2301E−39 | C12: 4.3823E−43 |
| C13: −5.1965E−47 | C14: 3.4539E−51 | C15: −9.9096E−56 |

The coefficients of the polynomial for the second hologram 48 are:

| | | |
|---|---|---|
| C1: 1.2106E−03 | C2: −1.7518E−08 | C3: 1.0986E−11 |
| C4: 9.5008E−17 | C5: −1.7982E−19 | C6: 2.4314E−22 |
| C7: −2.1111E−25 | C8: 1.2363E−28 | C9: −5.0422E−32 |
| C10: 1.4751E−35 | C11: −3.0774E−39 | C12: 4.4588E−43 |
| C13: −4.2390E−47 | C14: 2.3581E−51 | C15: −5.7239E−56 |

Figure 6:
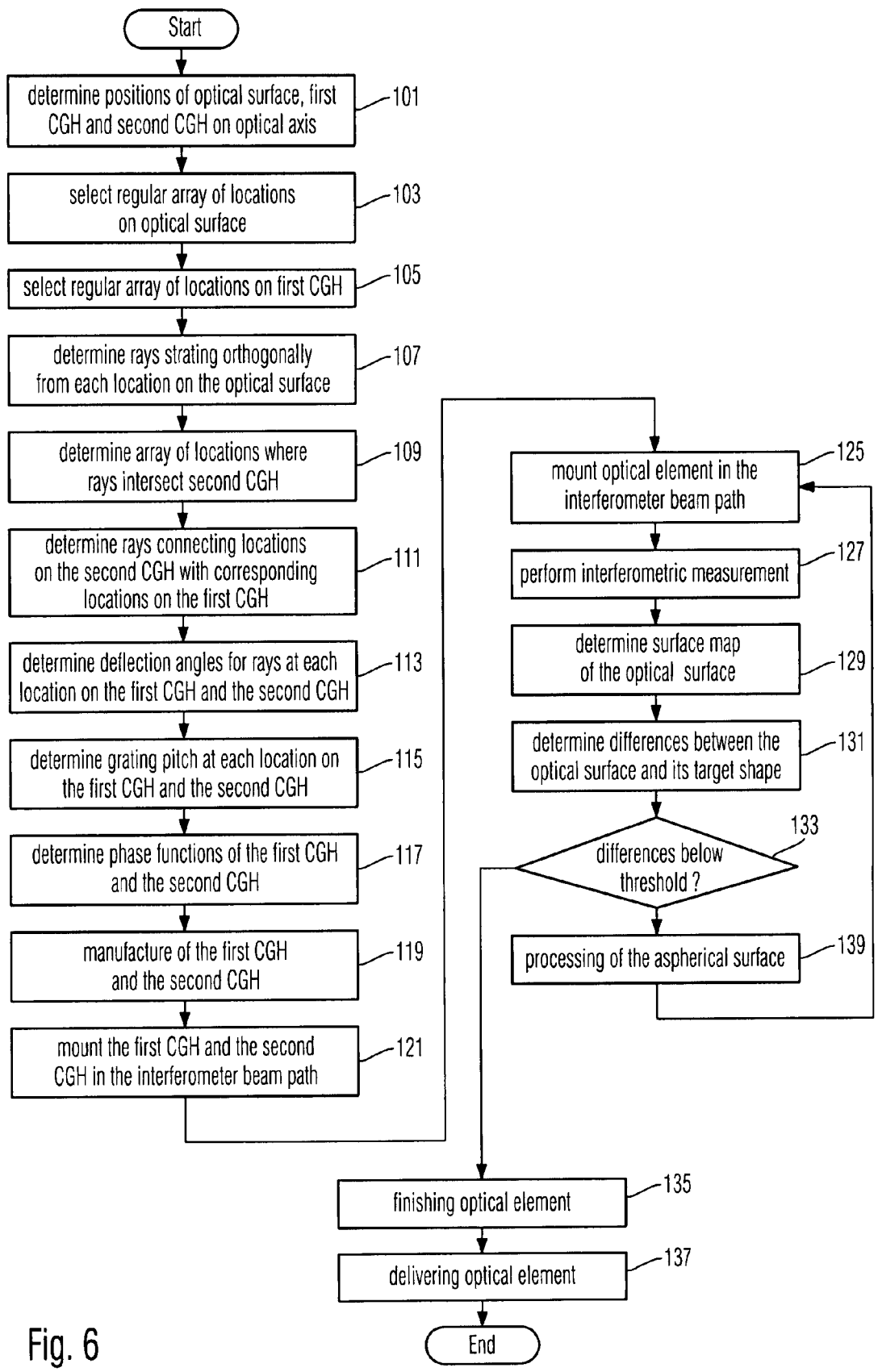
FIG. 6 is a flow chart of a method for manufacturing the optical element using the interferometer system in FIG. 3.

A method of designing and manufacturing the computer generated holograms 44 and 48 is illustrated with reference to the flow chart of FIG. 6 below.

In a first step 101, positions of the holograms 44 and 48 and of the optical surface 3 on axis 7a are determined. A regular array of locations on surface 3 is selected in a step 103. A corresponding regular array of locations on the surface 43 of the first hologram 44 is selected in a step 105. A ray tracing program is used to calculate rays 51 which start from the optical surface 3 at an angle of 90° with respect to the surface at each selected location of the array thereon, in a step 107. Locations where these rays intersect the surface 47 of the second hologram 48 are calculated in a step 109. Thereafter, rays 50 connecting the locations of intersection with surface 47 with the corresponding locations of the regular array on the surface 43 of the first hologram 44 are calculated in a step 111. Deflection angles between rays 49 and 50 on the surface 43 of first hologram 44 and deflection angles between rays 50 and 51 at the surface 47 of the second hologram 48 are calculated in a step 113. A grating pitch is determined in a step 115 for each location on the surfaces 43, 47 of the first and second holograms 44, 48 based on the determined deflection angles. The phase function for each hologram 44, 48 is calculated in a step 117 by integrating the grating pitches determined in step 115.

The first and second holograms 44, 48 are manufactured based on the determined phase functions in a step 119.

Thereafter, the first and second holograms 44 and 48 are mounted in the beam path of the interferometer system 1a in a step 121.

A method of manufacturing the optical surface 3 to a high accuracy using an interferometer system 1a is further illustrated with reference to the flowchart shown in FIG. 6. The optical element 5 is arranged in the beam path of the beam 23a of measuring light in a step 125, and an interferometric measurement is taken in a step 127. After completing the interferometric measurement, a surface map of the optical surface is determined in a step 129, based on the interferometric measurement of the optical surface 3.

Differences between the measured shape of the optical surface and its target shape are calculated in a step 131, based on the surface map determined in step 129. In a step 133, a decision is made as to whether the tested aspherical surface corresponds to its target shape, i.e. to the specification for the finished optical surface. If the differences are below suitably chosen thresholds, a finishing step 135 is performed on the optical surface. The finishing may include a final polishing of the surface or depositing a suitable coating, such as a reflective coating, an anti-reflective coating, and a protective coating applied to the optical surface by suitable methods, such as sputtering. The reflective coating may comprise, for example, a plurality of layers, such as ten layers of alternating dielectric materials, such as molybdenum oxide and silicon oxide. Thicknesses of such layers may be about 5 nm and will be adapted to a wavelength to be reflected from the optical surface, such that a reflection coefficient is substantially high. Finally, the reflective coating may be covered by a protective cap layer for passivating the reflective coating. The cap layer may include a layer formed by depositing materials such as ruthenium. The anti-reflective coating which is intended to reduce reflections of radiation from the optical surface of the optical element, such as a lens element, may include materials, such as magnesium fluoride, lanthanum oxide and other suitable materials. Also the anti-reflective coating may be passivated by a protective cap layer.

If the determined differences are below the thresholds in step 133, the procedure is continued at a step 139 of processing the optical surface 3. For this purpose, the optical element is removed from the beam path of the interferometer optics 15a and mounted on a suitable machine tool to remove those surface portions of the optical surface at which differences between the determined surface shape and the target shape exceed the threshold. Thereafter, the procedure is continued at step 125 and the optical element 3 is again mounted in the beam 23a of measuring light in the interferometer system 1a, and the measurement of the surface shape of the optical surface, determining differences from the target shape and processing is repeated until the differences are below the thresholds.

The processing may include operations such as milling, grinding, loose abrasive grinding, polishing, ion beam figuring and magneto-rheological figuring.

After the optical surface is finished in step 135, the optical element is delivered and incorporated in an optical system in a step 137. Thereafter a next optical element to be tested is mounted in the interferometer beam path in step 125 and repeated measuring and machining of such next surface is performed until this surface fulfils the specifications.

The above threshold values will depend on the application of the optical surface in the optical system for which it is designed. For example, if the optical surface is a lens surface in an objective for imaging a reticle structure onto a resist with radiation of a wavelength $\lambda$=193 nm, such threshold value may be in a range of about 1 nm to 10 nm, and if the optical surface will be used as a mirror surface in an imaging objective using EUV (extreme ultraviolet) radiation with a wavelength of $\lambda$=13.5 nm, the threshold value will be in a region of about 0.1 nm to 1.0 nm. It is to be noted that it is not necessary that the above mentioned threshold is a constant threshold over the whole area of the optical surface. It is possible that the threshold is dependent on e.g. a distance from a center of the optical surface or some other parameters. In particular, plural thresholds may be defined each for different ranges of spatial frequencies of differences between the measured surface and its target shape.

Figure 7:
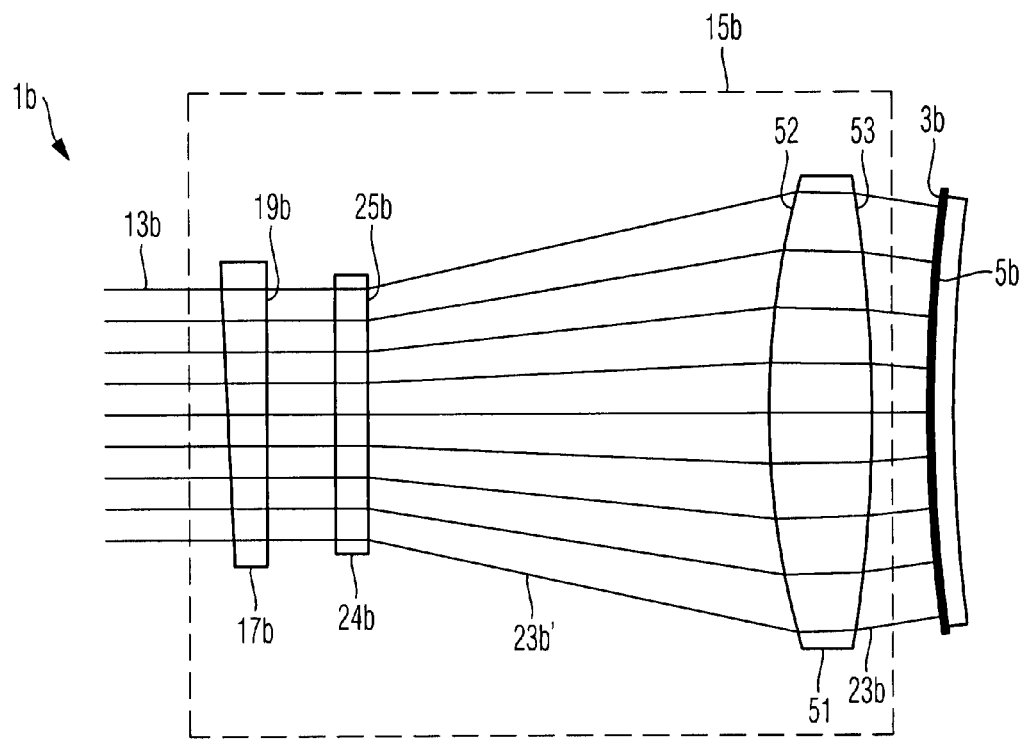
FIG. 7 illustrates an interferometer system for testing an optical element according to a further comparative example in which one single hologram is used.

FIG. 7 illustrates a portion of an interferometer system 1b of a conventional type using one single hologram. An interferometer optics 15b of the interferometer system 1b is supplied with a beam 13b of measuring light having substantially flat wavefronts, and comprises a wedge shaped substrate 17b providing a Fizeau surface 19b of the interferometer system 1b, a substrate 24b carrying a hologram 25b and a lens 51 to generate a beam 23b of measuring light which is substantially orthogonally incident on a surface 3b of an optical element 5b to be manufactured. The hologram 25b diffracts beam 13b to form a beam 23b' which is transformed by lens 51 into beam 23b.

Figure 8:
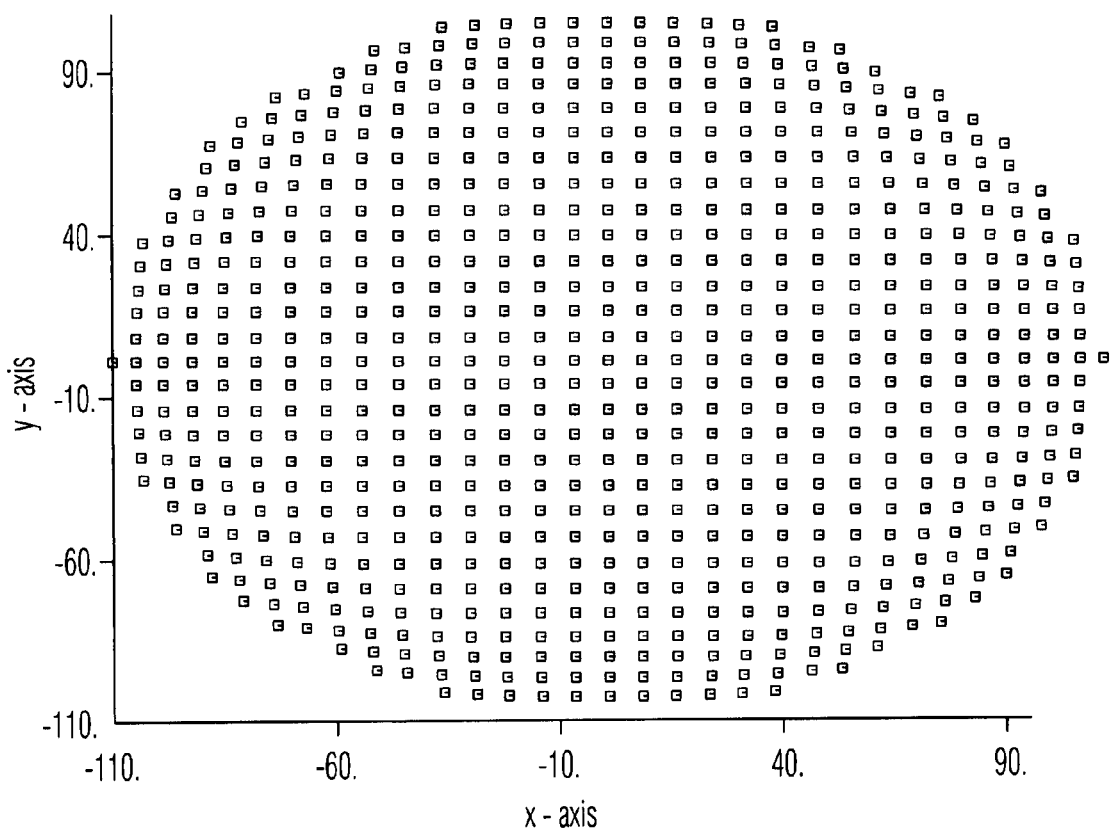
FIG. 8 shows a distorted array of locations on the optical element which is imaged into a regular array of locations on a detector in the interferometer system shown in FIG. 7.

The interferometer optics 15b introduces a considerable distortion into the imaging of optical surface 3b onto a detector of the interferometer system 1b as is evident from FIG. 8 showing a distorted array of locations on the optical element 3b which is imaged onto a regular area of locations on the detector.

Figure 9:
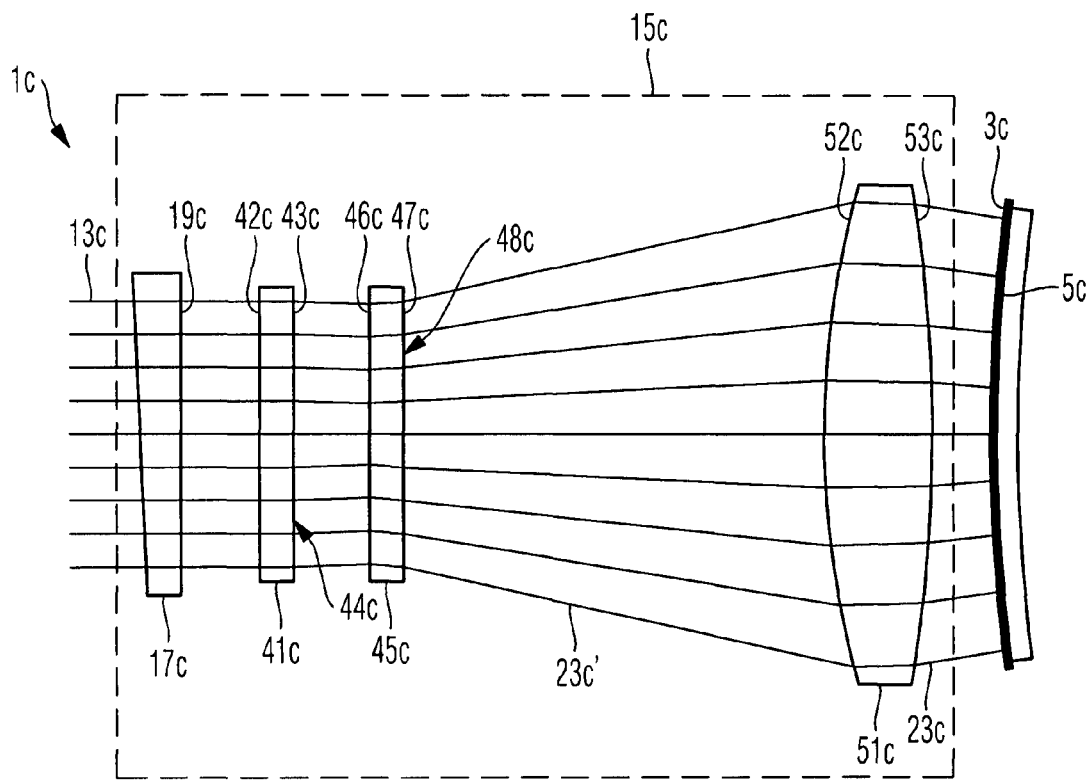
FIG. 9 illustrates an interferometer system for testing an optical element according to a second embodiment of the invention, in which two holograms are used.
Figure 10:
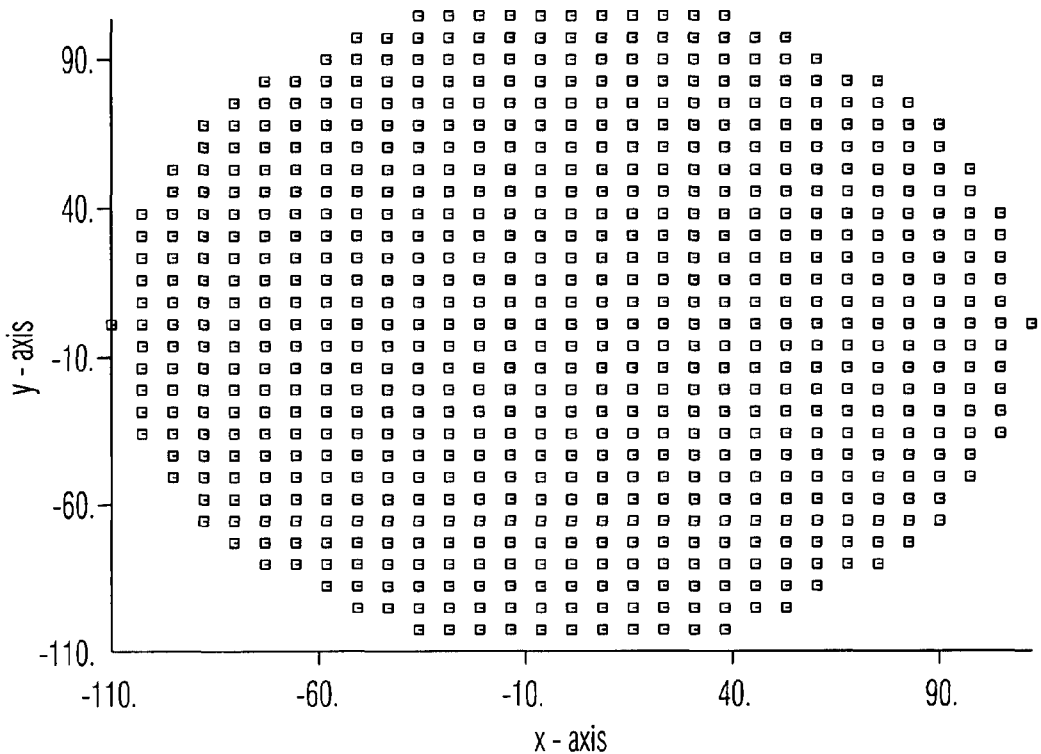
FIG. 10 shows an array of locations on the optical element which is imaged into a regular array of locations on a detector in the interferometer system shown in FIG. 9.

FIG. 9 illustrates a portion of an interferometer system 1c according to an embodiment of the present invention and using two holograms provided at a distance from each other along the beam path of the beam of measuring light. An interferometer optics 15c of the interferometer system 1c is supplied with a beam 13c of measuring light having substantially flat wavefronts, and comprises a substrate 17c providing a Fizeau surface 19c of the interferometer system 1c, two substrates 41c and 45c, each carrying a computer generated hologram 44c, 48c on surfaces 43c and 47c, respectively, and a lens 51c having lens surfaces 52c and 53c. The two holograms 44c and 48c and the lens 51c are designed such that the beam 13c of measuring light is transformed into a beam 23c, which is orthogonally incident on the optical surface 3b at each location thereof and such that the imaging of the optical surface 3b onto a detector of the interferometer system 1c is substantially free of distortion. The substantially distortion free imaging of the optical surface 3b onto the detector is apparent from FIG. 10, which shows an array of locations on the optical element which is imaged into a regular array of locations on the detector.

The holograms 43c and 48c are calculated by a computational method as illustrated with reference to FIG. 6 above, wherein the ray tracing starting from the optical surface 3b towards the second hologram 48c includes a ray tracing through the lens 51c.

The parameters of aspherical surface 3b are as follows:

| K: 0.000000 | A: 0.000000E+00 | B: 0.400000E−12 |
| C: 0.000000E+00 | D: 0.000000E+00 | |

Optical data of the interferometer optics 15c are given in Table 2 below.

TABLE 2

| Surface | Radius | Distance | Edge Thickness | yMax | Medium | Refractive Index |
|---|---|---|---|---|---|---|
| 42c | ∞ | 15.00000 | 15.00000 | 70.00000 | SIO2HL | 1.4570358 |
| 43c | ∞ | 30.00000 | 30.00000 | 70.00000 | air | 1.0000000 |
| 46c | ∞ | 15.00000 | 15.00000 | 70.00000 | SIO2HL | 1.4570358 |
| 47c | ∞ | 340.30953 | 364.35216 | 70.0000 | air | 1.0000000 |

TABLE 2-continued

| Surface | Radius | Distance | Edge Thickness | yMax | Medium | Refractive Index |
|---|---|---|---|---|---|---|
| 52c | 301.00000 | 70.00000 | 34.58143 | 117.87965 | SIO2HL | 1.4570358 |
| 53c | −600.00000 | 20.00000 | 38.83209 | 116.28294 | air | 1.0000000 |
| 3b | 900.00000 | −20.00000 | | 110.00000 | REFL | |

The coefficients of formula (2) for the first hologram 44c on surface 43c are as follows:

C1: −4.1854E−04   C2: −1.8315E−07   C3: 3.6789E−11
C4: −1.9723E−15   C5: 1.7749E−19   C6: −2.5103E−24
C7: 7.2263E−28   C8: 4.3473E−31   C9: −1.3488E−34
C10: 7.3772E−39

The coefficients of formula (2) for the second hologram 48c on surface 47c are as follows:

C1: 1.4447E−03   C2: 2.4396E−07   C3: −3.6174E−11
C4: −5.3029E−15   C5: −1.8327E−19   C6: 6.0028E−22
C7: −1.4299E−25   C8: 1.6857E−29   C9: −1.0887E−33
C10: 3.1637E−38

Figure 11:
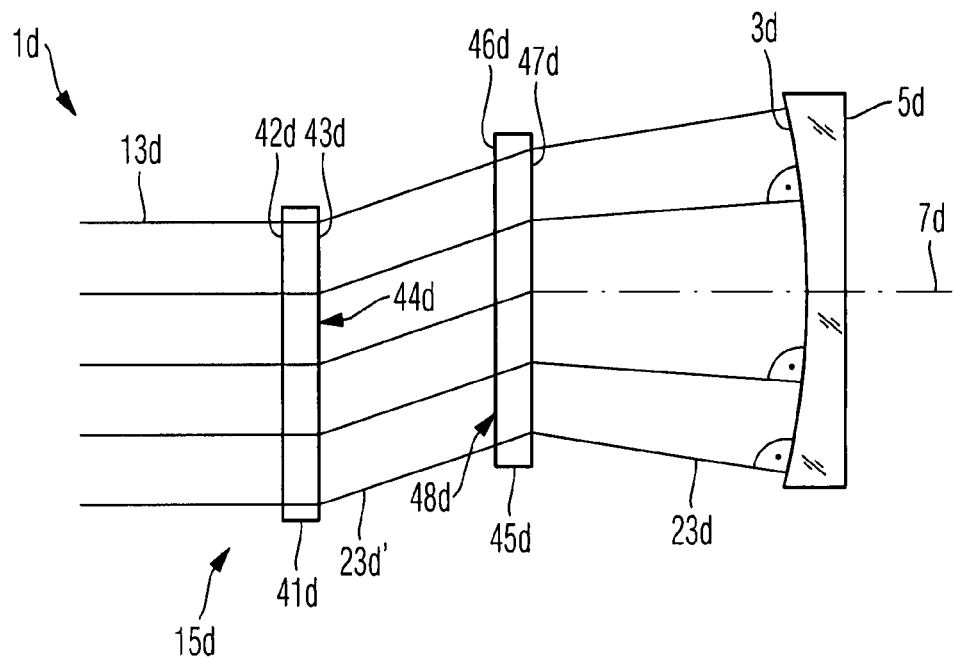
FIG. 11 illustrates an interferometer system for testing an optical element according to a third embodiment of the invention.

FIG. 11 illustrates a further embodiment of an interferometer system 1d using two holograms for measuring an aspherical surface. An interferometer optics 15d of interferometer system 1d comprises a first substrate 41d and a second substrate 45d disposed at a distance from each other in a beam path of measuring light. Substrate 41d carries on a surface 43d thereof a hologram 44d which diffracts a beam 13d having substantially flat wavefronts to form a beam 23d'. Substrate 45d carries on a surface 46d thereof a hologram 48d which diffracts beam 23d' to form a beam 23d of measuring light which is substantially orthogonally incident on optical 3d to be tested. Holograms 44d and 48d are calculated such that an imaging of the optical surface 3d onto a detector of the interferometer system 1d is substantially free of distortion. Both holograms 43d and 48d diffract each ray of beams 13d and 23d' by a substantial angle in a respective same direction.

Figure 12:
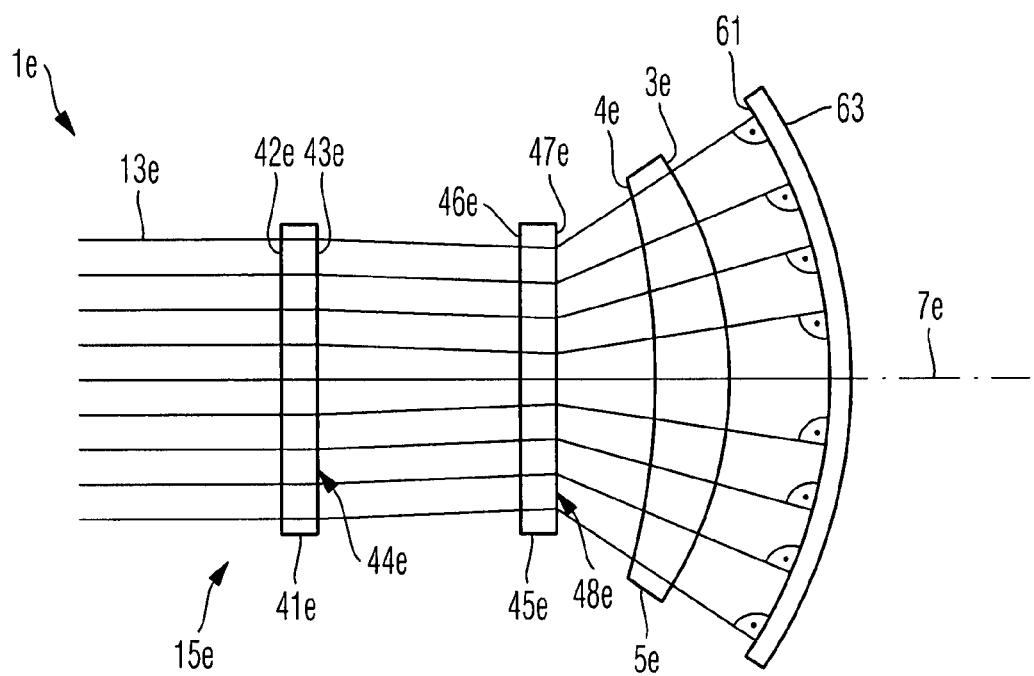
FIG. 12 illustrates an interferometer system for testing an optical element according to a fourth embodiment of the invention.

In the embodiments illustrated above, the measuring light having interacted with the optical surface to be tested is light reflected from the optical surface. FIG. 12 illustrates an interferometer system 1e using two holograms in which measuring light interacting with the optical surface to be tested traverses the same. An interferometer 15e of interferometer system 1e comprises two substrates 41e and 45e carrying first and second holograms 44e and 48e, respectively, and a spherical mirror surface 1e of a mirror 63. Spherical mirror surface 61 is manufactured with a high accuracy and is independently tested by a conventional method. The optical element 5e to be manufactured is a lens having a concave surface 4e which is already manufactured to a high precision, and a convex surface 3e having an aspherical target shape which is to be tested and compared to its target shape with the interferometer system 1e. Lens 5e is disposed at a predetermined position on an axis of symmetry 7e in the beam path of measuring light between the second hologram 48e and spherical mirror surface 61. Methods involving testing optical elements using measuring light traversing the optical element are disclosed in the application Ser. No. 10/845,259 filed by the present applicant on May 14, 2004, the entire contents of which are incorporated herein by reference.

Phase functions of holograms 44e and 48e are calculated by a computation method similar to the method illustrated with reference to FIG. 6 above. The holograms 43e and 48e are designed such that a correspondence between locations on optical surface 3e to be manufactured and locations on a detector of the interferometer system 1e is substantially free of distortion. This is achieved by first selecting a regular array of locations on surface 3e and calculating corresponding locations on mirror surface 61 from which rays starting at an angle of 90° with respect to the mirror surface will be incident on optical surface 3e at the respective selected locations. The further ray tracing with rays starting from those locations on the mirror surface 61 and traversing the optical element 5e, the second hologram 48e and the first hologram 44e to match with a corresponding regular array of locations thereon is then performed in accordance with the method illustrated with FIG. 6 above.

In the embodiments illustrated above, the optical surfaces to be tested are surfaces of a rotationally symmetric shape wherein the optical element is also rotationally symmetric with respect to an axis of rotation. The invention is, however, not limited thereto. The optical element to be tested may be an off-axis optical element, which means that the optical surface comprises only a portion of a rotationally symmetric shape wherein an axis of rotation of the shape does not coincide with an axis of symmetry of the optical element. In particular, the axis of rotational symmetry of the shape may be disposed outside of the optical surface.

Further, the optical surface to be tested may be an aspherical surface not having an axis of symmetry at all.

Figure 13:
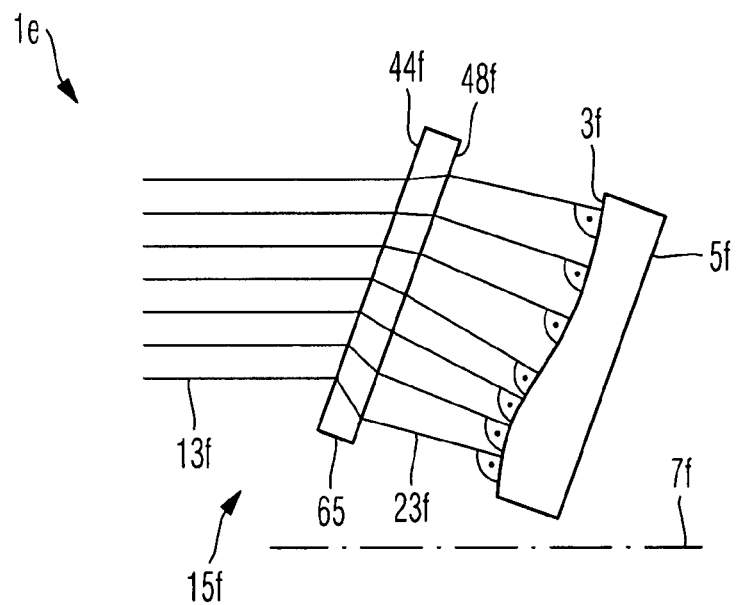
FIG. 13 illustrates an interferometer system for testing an optical element according to a fifth embodiment of the invention.

FIG. 13 shows an embodiment of an interferometer system 1e using two holograms 44f and 48f for testing an aspherical surface 3f of an optical element 5f wherein an axis 7f of rotational symmetry of the surface 3f is disposed at a distance from the optical element 5f.

Other than in the previous embodiments illustrated above, the two holograms 44f and 48f are provided on opposite surfaces of a same substrate 65.

Figure 14:
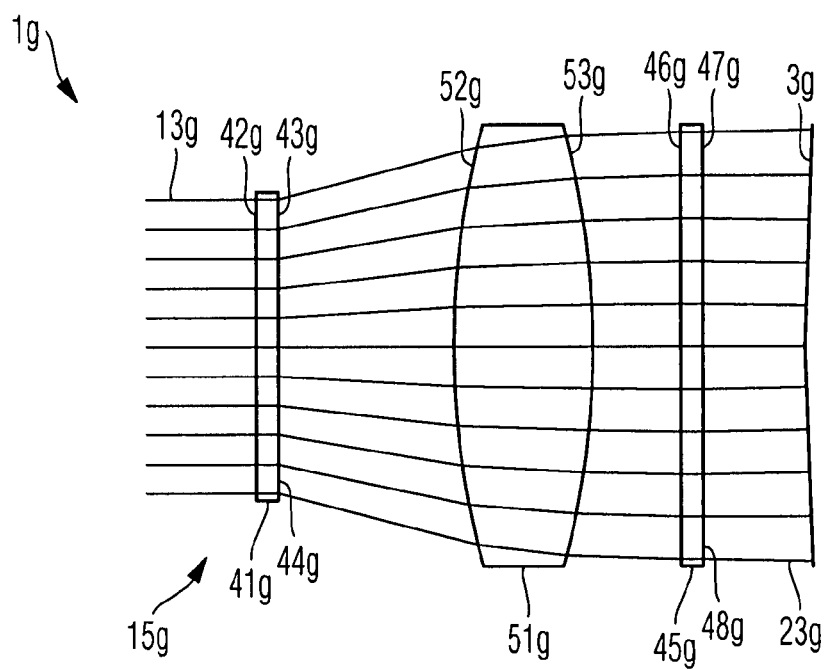
FIG. 14 illustrates an interferometer system for testing an optical element according to a sixth embodiment of the invention.

FIG. 14 illustrates a portion of an interferometer system 1g according to a further embodiment of the present invention. An interferometer optics 15g of the interferometer system 1g is supplied with a beam 13g of measuring light having substantially flat wavefronts. The interferometer optics 15g comprises two substrates 41g and 45g, each carrying a computer generated hologram 44g, 48g on surfaces 43g and 47g, respectively. The two substrates 41g and 45g are disposed at a distance from each other, and a lens 51g having lens surfaces 52g and 53g is disposed in-between substrates 41g and 45g. The two holograms 44g and 48g and the lens 51g are defined such that the beam 13g of measuring light is transformed into a beam 23g which is orthogonally incident on an optical surface 3g to be tested at each location thereof, and such that the imaging of the optical surface 3g onto a detector of the interferometer system 1g is substantially free of distortion.

The parameters of the aspherical surface 3g are as follows:

| K: 0.000000 | A: −.405970E−07 | B: −.783010E−14 |
| C: 0.715740E−16 | D: −.217810E−20 | |

Optical data of the interferometer optics 15g are given in Table 3 below:

TABLE 3

| Surface | Radius | Distance | Edge Thickness | yMax | Medium | Refractive Index |
|---|---|---|---|---|---|---|
| 42g | ∞ | 9.00000 | 9.00000 | 68.80000 | SIO2HL | 1.4570358 |
| 43g | ∞ | 83.00000 | 92.10369 | 68.80000 | | 1.0000000 |
| 52g | 473.09700 | 66.00000 | 43.69397 | 92.36331 | SIO2HL | 1.4570358 |
| 53g | −362.60300 | 41.00000 | 54.20234 | 96.95417 | | 1.0000000 |
| 46g | ∞ | 9.00000 | 9.00000 | 98.44730 | SIO2HL | 1.4570358 |
| 47g | ∞ | 50.00000 | 51.44296 | 98.61743 | | 1.0000000 |
| 3g | 1000.00000 | | | 100.00000 | REFL | |

The coefficients of formula (2) for the first hologram 44g on surface 43g are as follows:

| C1: 2.1076E−03 | C2: −6.8604E−08 | C3: 2.0794E−11 |
| C4: −4.3810E−15 | C5: −1.9065E−18 | C6: 1.5072E−21 |
| C7: −4.2056E−25 | C8: 6.0195E−29 | C9: −4.4088E−33 |
| C10: 1.3192E−37 | | |

The coefficients of formula (2) for the second hologram 48g on surface 47g are as follows:

| C1: −8.1705E−04 | C2: 4.8852E−08 | C3: −9.6561E−13 |
| C4: 4.6487E−17 | C5: 3.4312E−20 | C6: −6.7765E−24 |
| C7: 1.8848E−28 | C8: 4.8934E−32 | C9: −4.5768E−36 |
| C10: 1.1921E−40 | | |

The first and second holograms used in the interferometer optics of the embodiments illustrated above may be holograms of any suitable type. According to some embodiments, the hologram is formed of a suitably designed grating having grating-forming structures which are repeatedly arranged adjacent to each other on the substrate. Each grating-forming structure has at least two elongated elements having a different influence on the beam of measuring light such that the repeated arrangement of the grating-forming structures has a function of a grating to diffract the measuring light.

According to preferred embodiments with respect to a high light intensity in the diffracted beam, the grating is a phase grating wherein the elongated elements forming each grating-forming structure provide different optical path lengths to the measuring light.

According to some further preferred embodiments herein, the hologram comprises at least one portion in which the grating is a blazed grating. Background information relating to the manufacture of blazed gratings is available from the article M. A. Golub, "Generalized conversion from the phase function to the blazed surface-relief profile of diffractive optical elements", in J. Opt. Soc. Am. A, Vol. 16, No. 5, May 1999, pages 1194 to 1201.

Possible examples of blazed gratings which may be used in embodiments of the present invention are illustrated in WO 2004/025335 A1, in the article of S. Astilean et al., "High-efficiency subwavelength diffractive element patterned in a high-refractive-index material for 633 nm", OPTICS LETTERS, Vol. 23, No. 7, Apr. 1, 1998, pages 552 to 554 and in the article of P. Lalanne et al., "Blazed binary subwavelength gratings with efficiencies larges than those of conventional échelette gratings", OPTICS LETTERS, Vol. 23, No. 14, Jul. 15, 1998, pages 1081 to 1083.

In an exemplary embodiment of a blazed grating, each grating-forming structure is composed of at least three different elongated path lengths providing elements which are arranged adjacent to each other and in which the optical path lengths provided by the path lengths providing elements of the grating-forming structure continuously increase in a direction transverse to the direction of elongation of the grating-forming structure.

Figure 15:
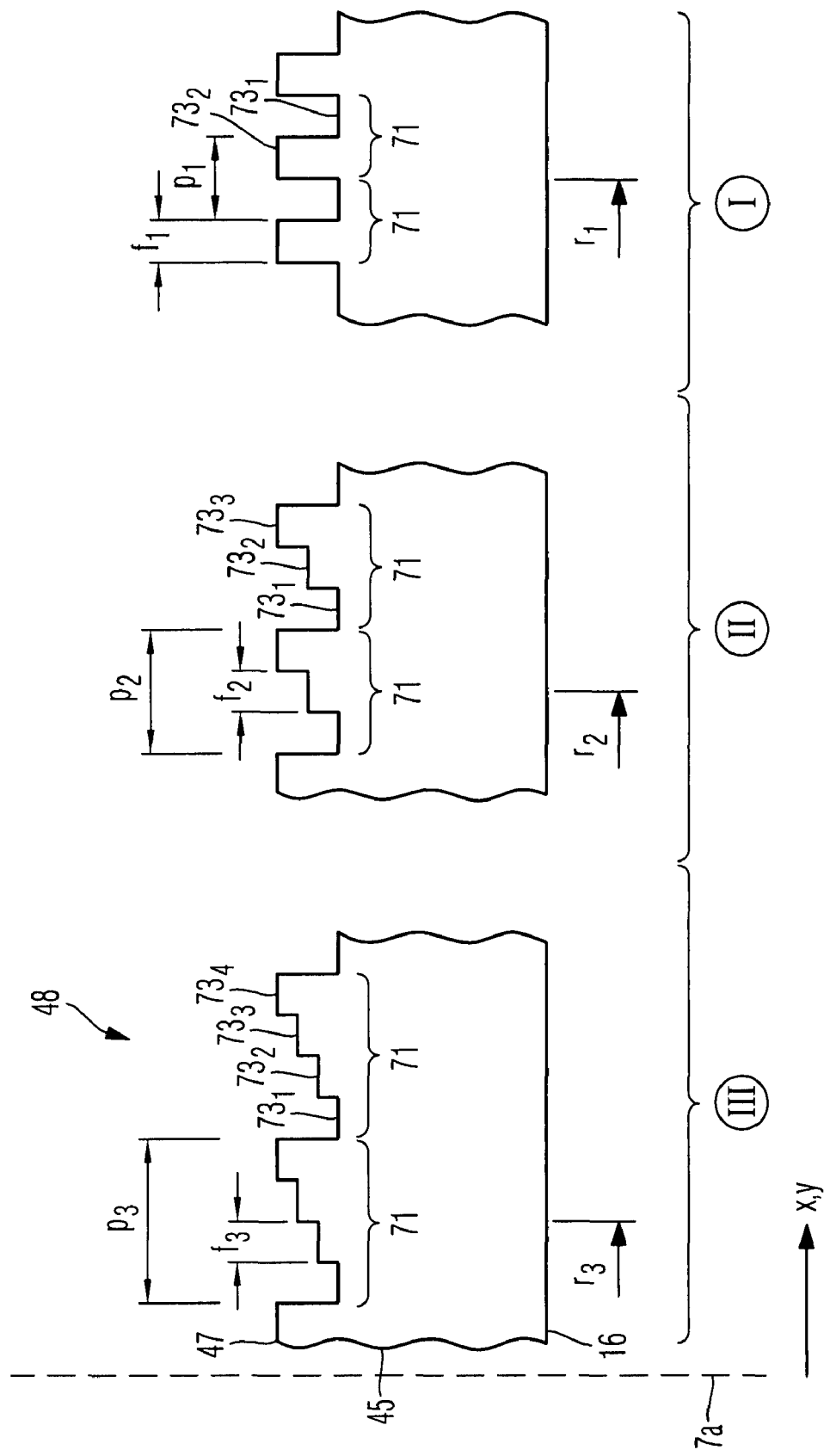
FIG. 15 is a schematic representation of a hologram which may be used in the interferometer systems shown in FIGS. 3, 9 and 11 to 14.

FIG. 15 illustrates a radial section through substrate 45 of the interferometer optics 15a shown in FIG. 3.

From FIG. 3 it appears that a diffraction angle between rays 50 and 51 increases with increasing distance from axis 7a to provide the highest diffraction angles at a periphery of hologram 49. A low pitch $p_1$ of less than about 1 μm is provided in a peripheral region I at a distance $r_1$ from axis 7a. Grating-forming structures 71 are arranged with pitch $p_1$ adjacent to each other to provide the grating such that rays 50 are deflected into rays 51 of a first diffraction order. Each grating-forming structure 71 is formed by a stepped surface profile of substrate 41 wherein the surface profile is composed of two different elements $73_1$ and $73_2$ which are designed such that a light ray traversing element $73_2$ experience a phase delay of one half of the wavelength of the light as compared to a light ray traversing element $73_1$. Each wavelength providing element 73 has a radial width $f_1$ in a range of about 0.5 μm to about 5 μm in region I.

In a ring shaped region I about axis 7a all grating-forming structures are of the type having two different path lengths providing elements $73_1$, $73_2$ wherein the pitch $p_1$ and the corresponding element width $f_1$ is adapted such that the hologram conforms to the calculated phase function.

In a ring shaped region II about axis 7a the necessary diffraction angles are smaller than the diffraction angles provided in region I, and a pitch $p_2$ of grating-forming structures 71 in region II is in a range of about 1 μm and about 10 μm. The grating provided by grating-forming structures 71 is a blazed grating comprising three different path lengths providing elements $73_1$, $73_2$, $73_3$ which are repeatedly arranged in this order to form the respective grating-forming structures 71. Elements $73_3$ provide a phase delay of one half of the wavelength as compared to elements $73_1$, and elements $73_2$ provide a phase delay of one fourth of the wavelength as compared to element $73_1$.

A width $f_2$ of the path length providing elements 73 in region II is in a range from about 0.5 µm to about 5 µm.

In a ring shaped region III closer to axis 7a than region II, the necessary diffraction angles are even smaller than the diffraction angles in region II, and a pitch $p_3$ of grating-forming structures 71 in region III is in a range of more than about 10 µm. The grating-forming structures 71 of region III are formed of four different path lengths providing elements $73_1, 73_2, 73_3, 73_4$ which are repeatedly arranged in this order in the radial direction to provide a blazed grating.

Elements $73_4, 73_3$ and $73_2$ provide phase delays of one half, two third and one third, respectively, of the wavelength of the measuring light as compared to elements $73_1$. A width $f_3$ of elements 73 in region III is in a range of about 0.5 µm to about 5 µm.

In the above illustrated embodiments, the interferometer optics comprises two holograms. It is, however, possible to use more than two holograms in the interferometer optics.

In the above illustrated embodiments, the interferometer systems are of a Fizeau-type. It is to be noted, however, that the invention is not limited to such type of interferometer. Any other type of interferometer, such as a Twyman-Green-type of interferometer, examples of which are illustrated in chapter 2.1 of the text book edited by Daniel Malacara, Optical Shop Testing, 2nd edition, Wiley interscience Publication (1992), a Michelson-type interferometer, examples of which are illustrated in chapter 2.1 of the text book edited by Daniel Malacara, a Mach-Zehnder-type of interferometer, examples of which are illustrated in chapter 2.6 of the text book edited by Daniel Malacara, a point-diffraction type interferometer, examples of which are illustrated in U.S. Pat. No. 5,548,403 and in the article "Extreme-ultraviolet phase-shifting point-diffraction interferometer: a wavefront metrology tool with subangstrom reference-wave accuracy" by Patrick P. Naulleau et al., Applied Optics-IP, Volume 38, Issue 35, pages 7252 to 7263, December 1999, and any other suitable type of interferometer may be used.

It is further to be noted that the optical components involved in the above interferometric methods are subject to gravity during measurement. This may result in deformations of the surfaces of those components which are fixed in suitable mounts for arranging the components within the beam path of the interferometer. Even though the optical axis is oriented horizontally in FIGS. 1 to 8 and 10, it is also possible to perform the same measurements with an optical axis oriented vertically in the gravitational field. In any event, it is possible to use mathematical methods to simulate deformations of the optical components in the gravitational field. One such method is known as FEM (finite element method). All determinations of optical properties and deviations illustrated above may involve taking into account results of such mathematical methods for correcting and/or improving the determined results.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. An optical element comprising at least one optical surface fulfilling the following relationships:

$$\sigma_{RMS} < 1.0 \text{ nm}$$

and $$\frac{\max(\beta(\phi, x, y))}{\min(\beta(\phi, x, y))} > 1.2$$

with $$\beta(\phi, x, y) = \frac{1/c(\phi, x, y) * \cos^3(\alpha(x, y))}{(z(x, y) - d + 1/c(\phi, x, y) * \cos(\alpha(x, y)))}$$

wherein:

$\sigma_{RMS}$ is a root-mean-square value of a surface roughness of the optical surface, determined for a spatial length scale in a range from 0.3 mm to 10.0 mm;

$\max(\beta(\phi,x,y))$ is a maximum value of $\beta$ for all locations (x,y) on the optical surface and all orientations ($\phi$);

$\min(\beta(\phi,x,y))$ is a minimum value of $\beta$ for all locations (x,y) on the optical surface and all orientations $\phi$;

$\alpha(x,y)$ is an angle between a surface normal of the optical surface at location (x,y) and an average over the surface normals at all locations of the optical surface;

$c(\phi,x,y)$ is a curvature of the optical surface at location (x,y) and determined at orientation $\phi$, $z(x,y)$ is a surface elevation of the optical surface at location (x,y), wherein for at least one location (x0,y0) $z(x0,y0)=0$ is fulfilled; and d is a constant with:

$$d = \max(z(x,y)) + 50 \text{ mm},$$

wherein $\max(z(x,y))$ is a maximum value of z for all locations (x,y) on the optical surface.

2. The optical element according to claim 1, wherein $$\frac{\max(\beta(\phi, x, y))}{\min(\beta(\phi, x, y))} > 1.5.$$

3. The optical element according to claim 1, wherein $\sigma_{RMS} < 0.2$ nm.

4. The optical element according to claim 1, wherein $\sigma_{RMS}$ is determined for a spatial length scale in a range from 0.3 mm to 3.0 mm.

5. The optical element according to claim 1, wherein $\sigma_{RMS}$ is determined for a spatial length scale in a range from 1.0 mm to 10.0 mm.

6. An optical element comprising at least one rotationally symmetric optical surface fulfilling the following relationships:

$$\sigma_{RMSa} < 1.0 \text{ nm}$$

and $$\frac{\max(\beta(\phi, x, y))}{\min(\beta(\phi, x, y))} > 1.2$$

with $$\beta(\phi, x, y) = \frac{1/c(\phi, x, y) * \cos^3(\alpha(x, y))}{(z(x, y) - d + 1/c(\phi, x, y) * \cos(\alpha(x, y)))}$$

wherein:

$\sigma_{RMSa}$ is a root-mean-square value of an absolute non-rotationally-symmetric surface error of the optical surface;

$\max(\beta(\phi,x,y))$ is a maximum value of $\beta$ for all locations (x,y) on the optical surface and all orientations $\phi$;

$\min(\beta\phi,x,y))$ is a minimum value of $\beta$ for all locations (x,y) on the optical surface and all orientations $\phi$;

$\alpha(x,y)$ is an angle between a surface normal of the optical surface at location (x,y) and an average over the surface normals at all locations of the optical surface;

$R(x,y)$ is a radius of curvature of the optical surface at location (x,y), $c(\phi,x,y)$ is a curvature of the optical surface at location (x,y) and determined at orientation $\phi$, and d is a constant with:

$$d = \max(z(x,y)) + 50 \text{ mm, wherein}$$

$\max(z(x,y))$ is a maximum value of z for all locations (x,y) on the optical surface.

7. The optical element according to claim 6, wherein $$\frac{\max(\beta(\phi, x, y))}{\min(\beta(\phi, x, y))} > 1.5.$$

8. The optical element according to claim 6, wherein $\sigma_{RMSa} < 0.2$ nm.

* * * * *

UNITED STATES PATENT AND TRADEMARK OFFICE
CERTIFICATE OF CORRECTION

| | | |
|---|---|---|
| PATENT NO. | : 7,848,031 B2 | Page 1 of 1 |
| APPLICATION NO. | : 11/795598 | |
| DATED | : December 7, 2010 | |
| INVENTOR(S) | : Jochen Hetzler et al. | |

It is certified that error appears in the above-identified patent and that said Letters Patent is hereby corrected as shown below:

Drawing Sheet 6 of 12: delete "strating" and insert -- starting --

Column 11, Line 24: delete "D==F" and insert -- D=E=F --

Column 18, Line 7: delete "larges" and insert -- larger --

Column 21, Line 7: In Claim 6, delete "min(β$\theta$,x,y))" and insert -- min(β($\theta$,x,y)) --

Signed and Sealed this
Fifteenth Day of November, 2011

David J. Kappos
*Director of the United States Patent and Trademark Office*